United States Patent Office 3,832,345
Patented Aug. 27, 1974

3,832,345
17-DESOXY STEROIDAL PYRAZOLES AND PROCESSES OF PREPARING THEM
Ralph F. Hirschmann, Scotch Plains, N.J., and John Fried, Palo Alto, Calif., assignors to Merck & Co., Inc., Rahway, N.J.
No Drawing. Continuation-in-part of application Ser. No. 505,986, Nov. 1, 1965, which is a continuation-in-part of application Ser. No. 476,160, July 30, 1965, both now abandoned. This application June 5, 1970, Ser. No. 43,961
Int. Cl. C07c 173/10
U.S. Cl. 260—239.5         2 Claims

ABSTRACT OF THE DISCLOSURE

The invention disclosed herein is concerned generally with novel [3,2-c] pyrazole compounds of the pregnane series, and with the process of preparing the same. More particularly, it relates to 4-pregneno-, 5α-pregnano-, and 4,6-pregnadieno- [3,2-c] pyrazoles which are unsubstituted at the 17α-position, and to processes of making these 17-desoxy-steroidal pyrazoles of the pregnane series by reacting the corresponding 17α-hydroxy 21-alkanoyloxy-steroidal pyrazole with a lower alkanolic solution of a mineral acid to form the corresponding 17-desoxy-21,21-dialkoxy analog, and reacting the latter with a reducing agent followed by a hydrolyzing agent to produce the corresponding 17-desoxy-20-hydroxy-21-aldehydo derivative, and reacting the latter compound with an alkali metal bisulfite followed by an alkali metal alkoxide to produce the corresponding 17-desoxy-20-keto-21-hydroxy-steroidal pyrazole.

---

This is a continuation-in-part of Ser. No. 505,986 filed Nov. 1, 1965 which, in turn, is a continuation-in-part of Ser. No. 476,160 filed July 30, 1965 both now abandoned.

The novel steroid compounds which form the subject of the present invention are those having structural formulas, A and B, and the $\Delta^4$ and $\Delta^{4,6}$ analogues of said compounds:

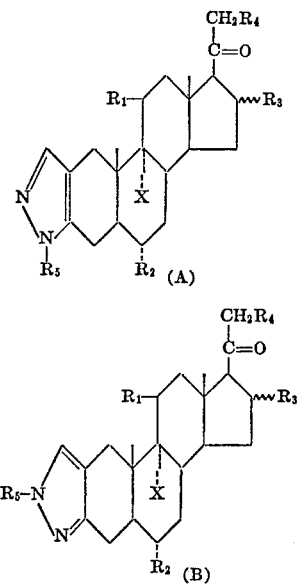

wherein:

$R_1$ is selected from the group consisting of hydrogen, β-hydroxy and keto,
$R_2$ is selected from the group consisting of hydrogen, α-methyl and α-fluoro,
$R_3$ is selected from the group consisting of hydrogen, α-methyl, β-methyl and methylene,
$R_4$ is selected from the group consisting of hydrogen, chloro, fluoro, hydroxy and acyloxy,
$R_5$ is selected from the group consisting of hydrogen, acyl, alkyl, cycloalkyl, aryl, aralkyl, a heterocyclic nucleus, and substituted derivatives thereof and
X is selected from the group consisting of hydrogen and fluoro, but X is fluoro only when $R_1$ is β-hydroxy or keto.

The above-defined steroids possess high antiinflammatory activity, and are especially effective for the treatment of typical inflammations.

The novel 21-hydroxy - 20-oxo-4-pregneno - (5α-pregnano, or 4,6-pregnadieno)-[3,2-c]pyrazoles of this invention are prepared by the precedures outlined in Flow Sheet A, starting from the 21-alkanoates of the corresponding 17α,21-dihydroxy-steroid, as defined by Compound 1 of Flow Sheet A.

Following the synthesis described in Flow Sheet A, a 17α,21-dihydroxy-20-oxo-4-pregneno-(5α-pregnano, or 4, 6-pregnadieno)-[3,2-c]pyrazole 21-alkanoate (Compound 1), on treatment with solution of a mineral acid dissolved in a lower alkanol, is transformed into the corresponding 17α-desoxy-20-oxo-21-al dialkylacetal steroid (Compound 2). In a preferred embodiment of this invention the steroid starting material is suspended in a solution of dry methanolic hydrogen chloride. The mixture is agitated to effect solution and then permitted to stand at approximately room temperature for a time period of several hours up to two days or longer. The product may be recovered in any suitable manner, for example, by adding an aqueous buffer solution of an alkali metal alkanoate such as sodium acetate and then extracting with a solvent, for example using a halogenated hydrocarbon solvent such as chloroform, methylene chloride or the like. The solvent extract is washed and dried, and the solvent evaporated to give a residue of the 17α-desoxy-20-oxo-21-al dialkylacetal steroid compound which can be purified by recrystallization.

The 17α-desoxy - 20-oxo - 21-al dialkylacetal steroid (Compound 2) then is converted to the corresponding 17α-desoxy-20-hydroxy-21-al (Compound 4) by first reducing the 20-oxo-steroid to the 20-hydroxy-steroid (Compound 3) and then hydrolyzing the 21-dialkylacetal to the 21-al (Compound 4). Reduction suitably takes place using a metal hydride, such as sodium borohydride in a solvent such as tetrahydrofuran. Hydrolysis of the 21-acetal to the 21-al convenientaly takes place by warming with a dilute lower alkanoic acid, such as acetic acid or the like.

The 17α-desoxy-20-hydroxy-21-al (Compound 4) is converted into the corresponding 17α-desoxy-20-oxo-21-hydroxysteroid (Compound 6) by first forming the alkali metal bisulfite addition product (Compound 5) and then treating the latter compound with an alkali metal alkoxide dissolved in a lower alkanol. The alkali metal bisulfite addition product is conveniently obtained, for example, by adding the steroid to a lower alkanol such as methanol to which has been added an aqueous solution of an alkali metal bisulfite such as sodium bisulfite. The bisulfite derivative of the 21-aldehydo-steroid can be obtained as a precipitate by vacuum concentration of this mixture in such a way as to remove most of the alkanol while leaving the aqueous phase. The bisulfite addition product then is treated with a base such as sodium methoxide or the like in a lower alkanol such as methanol in an inert atmosphere, such as nitrogen. The product is recovered by neutralizing the base, for example, by means of a dilute alkanoic acid such as acetic acid, and concentrating to remove most of the alkanol. Water is added and the mixture is extracted with a solvent such as chloroform or methylene chloride. The solvent extract then is washed and dried, and the solvent evaporated to give a residue of the desired 21-hydroxy-20-oxo-17α-desoxy-steroid (Compound 6), which can be purified by recrystallization.

The 21 - hydroxy-20-oxo-17α-desoxy-4-pregnene-(5α-pregnano, or 4,6-pregnadieno-[3,2-c]pyrazole (Compound 6 of Flow Sheet A) is converted into the 21–F, 21–cl, 21-desoxy-, 21-carboxylic acylate and the 21-phosphate derivatives following the procedures outlined in Flow Sheet A and described in detail in Example 3 for steroids in which $R_5$ is hydrogen, and in Example 2 for steroids in which $R_5$ is a substituent other than hydrogen.

Thus, the 21-acyl derivative (Compound 11) is prepared from the N-substituted-21-hydroxy-[3,2-c]pyrazole by treating with one equivalent of an acylating agent, e.g., a lower hydrocarbon carboxylic acid acylating agent, such as benzoic anhydride, tertiary butyl acetyl chloride; a lower alkanoic anhydride or lower alkanoyl halide such as acetic anhydride, propionic anhydride; or a polybasic anhydride such as β,β-dimethylglutaric anhydride, succinic anhydride and the like, in the presence of an organic base such as pyridine.

The 21-acyl derivative of the N-unsubstituted[3,2-c]pyrazole is prepared by reacting the latter compounds with 2-equivalents of the acylating agent to form the N-acyl-21-acylate and then heating the latter compound with aqueous acetic acid, whereupon the N-acyl group is selectively removed.

The 21-hydroxy-[3,2-c]pyrazole (Compound 6) is reacted with methane sulfonyl chloride in a non-aqueous base to form the corresponding 21-mesylate (Compound 7). A steroid in which $R_5$ is hydrogen is preferably converted to the N-carbamyl derivative before undergoing this reaction.

The 21-fluoro-[3,2-c]pyrazole (Compound 8) is prepared from the corresponding 21-hydroxy-[3,2-c]pyrazole 21-mesylate (Compound 7) by heating with an alkali fluoride in a solvent to form the corresponding 21-fluoro-compound. There are thus obtained the 21-fluoro-analogues of all of the 21-hydroxy compounds named in Columns 4, 5, 6 and 7.

The 21-hydroxy-[3,2-c]pyrazole 21-mesylate (Compound 7) is heated with an alkali iodide to form the 21-iodo-compound (Compound 9). In a preferred method for carrying out this reaction, sodium iodide is added to the steroid dissolved in acetone, and the resulting mixture is heated at reflux temperature for approximately one hour.

The 21-iodo-[3,2-c]pyrazole is heated with an alkali bisulfite in a solvent to form the corresponding 21-desoxy-compound (Compound 10). A preferred method is to add sodium bisulfite to a suspension of the steroid in aqueous ethanol and then heat the mixture under reflux for a period of about an hour. There are thus obtained the 21-desoxy derivatives of all of the compounds listed in Columns 4, 5, 6 and 7.

An N-carbamyl group present at $R_5$ is removed by treatment with nitrous acid. For example, the steroid is treated in glacial acetic acid solution with sodium nitrite.

The 21-dihydrogen phosphate esters of all of the 21-hydroxy-compounds listed in Columns 4, 5, 6 and 7 are prepared by the reaction of the 21-iodo steroid (Compound 9) with a mixture of silver phosphate and phosphoric acid. Both the mono- and dialkali metal salts may be obtained by neutralization of the dihydrogen phosphate ester with an alkali methoxide. Treatment with additional amounts of alkali methoxide will convert an N-acyl-steroid ($R_5$=acyl) into the free amine ($R_5$=H) dialkali metal salt from which the diyhdrogen phosphate can be obtained by contacting with an ion exchange resin.

All of the foregoing [3,2-c]pyrazole compounds form salts such as the hydrochloride, sulfate, chlorate, perchlorate, picrate and trichloroacetate, on treatment with the corresponding acid.

Among the compounds of our invention are included:

21-hydroxy-20-oxo-4-pregneno-[3,2-c]pyrazole,
21-hydroxy-20-oxo-5-pregnano-[3,2-c]pyrazole,
6α-fluoro-21-hydroxy-20-oxo-4-pregneno-[3,2-c]pyrazole,
21-hydroxy-6α-methyl-20-oxo-4-pregneno-[3,2-c]pyrazole,
21-hydroxy-16α-methyl-20-oxo-4-pregneno-[3,2-c]pyrazole,
21-hydroxy-16β-methyl-20-oxo-4-pregneno-[3,2-c]pyrazole
21-hydroxy-16-methylene-20-oxo-4-pregneno-[3,2-c]pyrazole,
21-hydroxy-20-oxo-2'-phenyl-4-pregneno-[3,2-c]pyrazole,
21-hydroxy-20-oxo-2'-phenyl-5-pregnano-[3,2-c]pyrazole,
6α-fluoro-21-hydroxy-20-oxo-2'-phenyl-4-pregneno-[3,2-c]pyrazole,
21-hydroxy-6α-methyl-20-oxo-2'-phenyl-4-pregneno-[3,2-c]pyrazole,
21-hydroxy-16α-methyl-20-oxo-2'-phenyl-4-pregneno-[3,2-c]pyrazole,
21-hydroxy-16β-methyl-20-oxo-2'-phenyl-4-pregneno-[3,2-c]pyrazole,
21-hydroxy-16-methylene-20-oxo-2'-phenyl-4-pregneno-[3,2-c]pyrazole,
21-hydroxy-20-oxo-2'-(p-fluorophenyl)-4-pregneno-[3,2-c]pyrazole,
6α-fluoro-21-hydroxy-20-oxo-2'-(p-fluorophenyl)-4-pregneno-[3,2-c]pyrazole,
21-hydroxy-6α-methyl-20-oxo-2'-(p-fluorophenyl)-4-pregneno-[3,2-c]pyrazole,
21-hydroxy-16α-methyl-20-oxo-2'-(p-fluorophenyl)-4-pragneno-[3,2-c]pyrazole,
21-hydroxy-16β-methyl-20-oxo-2'-(p-fluorophenyl)-4-pregneno-[3,2-c]pyrazole,
21-hydroxy-16-methylene-20-oxo-2'-(p-fluorophenyl)-4-pregneno-[3,2-c]pyrazole,
21-hydroxy-20-oxo-4,6-pregnadieno-[3,2-c]-pyrazole,
6-fluoro-2-hydroxy-20-oxo-4,6-pregnadieno-[3,2-c]pyrazole,
21-hydroxy-6-methyl-20-oxo-4,6-pregnadieno-[3,2-c]-pyrazole,
21-hydroxy-16α-methyl-20-oxo-4,6-pregnadieno-[3,2-c]pyrazole,
21-hydroxy-16β-methyl-20-oxo-4,6-pregnadieno-[3,2-c]pyrazole,
21-hydroxy-16-methylene-20-oxo-4,6-pregnadieno-[3,2-c]pyrazole,
6-fluoro-21-hydroxy-20-oxo-2'-phenyl-4,6-pregnadieno-[3,2-c]pyrazole,
21-hydroxy-6-methyl-20-oxo-2'-phenyl-4,6-pregnadieno-[3,2-c]pyrazole,
21-hydroxy-16α-methyl-20-oxo-2'-phenyl-4,6-pregnadieno-[3,2-c]pyrazole,
21-hydroxy-16β-methyl-20-oxo-2'-phenyl-4,6-pregnadieno-[3,2-c]pyrazole,
21-hydroxy-16-methylene-20-oxo-2'-phenyl-4,6-pregnadieno-[3,2-c]pyrazole,
21-hydroxy-20-oxo-2'-(p-fluorophenyl)-4,6-pregnadieno-[3,2-c]pyrazole,
6-fluoro-21-hydroxy-20-oxo-2'-(p-fluorophenyl)-4,6-pregnadieno-[3,2-c]pyrazole,
21-hydroxy-6-methyl-20-oxo-2'-(p-fluorophenyl)-4,6-pregnadieno-[3,2-c]pyrazole,
21-hydroxy-16α-methyl-20-oxo-2'-(p-fluorophenyl)-4,6-pregnadieno-[3,2-c]pyrazole,
21-hydroxy-16β-methyl-20-oxo-2'-(p-fluorophenyl)-4,6-pregnadieno-[3,2-c]pyrazole,
21-hydroxy-16-methylene-20-oxo-2'-(p-fluorophenyl)-4,6-pregnadieno-[3,2-c]pyrazole,
11β,21-dihydroxy-20-oxo-4-pregneno-[3,2-c]pyrazole, 9α-fluoro-11β,21-dihydroxy-20-oxo-5-pregnano-
  [3,2-c]pyrazole,
9α-fluoro-11β,21-dihydroxy-20-oxo-4-pregneno-[3,2-c]
  pyrazole,
11β,21-dihydroxy-6α-methyl-20-oxo-4-pregneno-
  [3,2-c]pyrazole,
11β,21-dihydroxy-16α-methyl-20-oxo-4-pregneno-
  [3,2-c]pyrazole,
11β,21-dihydroxy-16β-methyl-20-oxo-4-pregneno-
  [3,2-c]pyrazole,
11β,21-dihydroxy-16-methylene-20-oxo-4-pregneno-
  [3,2-c]pyrazole,
11β,21-dihydroxy-20-oxo-2'-phenyl-4-pregneno-
  [3,2-c]pyrazole,
9α-fluoro-11β,21-dihydroxy-20-oxo-2'-phenyl-4-
  pregneno-[3,2-c]pyrazole,
9α-fluoro-11β,21-dihydroxy-20-oxo-2'-phenyl-4-
  pregneno-[3,2-c]pyrazole,
11β,21-dihydroxy-6α-methyl-20-oxo-2'-phenyl-4-
  pregneno-[3,2-c]pyrazole,
11β,21-dihydroxy-16α-methyl-20-oxo-2'-phenyl-4-
  pregneno-[3,2-c]pyrazole,
11β,21-dihydroxy-16β-methyl-20-oxo-2'-phenyl
  4-pregneno-[3,2-c]pyrazole,
11β,21-dihydroxy-6α,16α-dimethyl-20-oxo-2'-phenyl-
  4-pregneno-[3,2-c]pyrazole,
11β,21-dihydroxy-20-oxo-2'-(p-fluorophenyl)-4-
  pregneno-[3,2-c]pyrazole,
9α-fluoro-11β,21-dihydroxy-20-oxo-2'-(p-fluoro-
  phenyl)-4-pregneno-[3,2-c]pyrazole,
9α-fluoro-11β,21-dihydroxy-20-oxo-2'-(p-fluoro-
  phenyl)-4-pregneno-[3,2-c]pyrazole,
11β,21-dihydroxy-6α-16α-dimethyl-20-oxo-2'-(p-fluoro-
  phenyl)-4-pregneno-[3,2-c]pyrazole,
11β,21-dihydroxy-16α-methyl-20-oxo-2'-(p-fluoro-
  phenyl)-4-pregneno-[3,2-c]pyrazole,
11β,21-dihydroxy-16β-methyl-20-oxo-2'-(p-fluoro-
  phenyl)-4-pregneno-[3,2-c]pyrazole,
11β,21-dihydroxy-6α,16α-dimethyl-20-oxo-2'-(p-
  fluorophenyl)-pregneno-[3,2-c]pyrazole,
11β,21-dihydroxy-20-oxo-4,6-pregnadieno-
  [3,2-c]pyrazole,
9α-fluoro-11β,21-dihydroxy-20-oxo-4,6-pregna-
  dieno-[3,2-c]pyrazole,
6-fluoro-11β,21-dihydroxy-20-oxo-4,6-pregna-
  dieno-[3,2-c]pyrazole,
11β,21-dihydroxy-6-methyl-20-oxo-4,6-pregna-
  dieno-[3,2-c]pyrazole,
11β,21-dihydroxy-16α-methyl-20-oxo-4,6-pregna-
  dieno-[3,2-c]pyrazole,
11β,21-dihydroxy-16β-methyl-20-oxo-4,6-pregna-
  dieno-[3,2-c]pyrazole,
11β,21-dihydroxy-16-methylene-20-oxo-4,6-pregna-
  dieno-[3,2-c]pyrazole,
9α-fluoro-11β,21-dihydroxy-20-oxo-2'-phenyl-4,6-
  pregnadieno-[3,2-c]pyrazole,
6-fluoro-11β,21-dihydroxy-20-oxo-2'-phenyl-4,6-
  pregnadieno-[3,2-c]pyrazole,
11β,21-dihydroxy-6-methyl-20-oxo-2'-phenyl-4,6-
  pregnadieno-[3,2-c]pyrazole,
11β,21-dihydroxy-16α-methyl-20-oxo-2'-phenyl-
  4,6-pregnadieno-[3,2-c]pyrazole,
11β,21-dihydroxy-16β-methyl-20-oxo-2'-phenyl-
  4,6-pregnadieno-[3,2-c]pyrazole,
11β,21-dihydroxy-16-methylene-20-oxo-2'-phenyl-4,6-
  pregnadieno-[3,2-c]pyrazole,
11β,21-dihydroxy-20-oxo-2'-(p-fluorophenyl)-4,6-
  pregnadieno-[3,2-c]pyrazole,
9α-fluoro-11β,21-dihydroxy-20-oxo-2'-(p-fluoro-
  phenyl)-4,6-pregnadieno-[3,2-c]pyrazole,
6-fluoro-11β,21-dihydroxy-20-oxo-2'-(p-fluorophenyl)-
  4,6-pregnadieno-[3,2-c]pyrazole,
11β,21-dihydroxy-6-methyl-20-oxo-2'-(p-fluoro-
  phenyl)-4,6-pregnadieno-[3,2-c]pyrazole,
11β,21-dihydroxy-16α-methyl-20-oxo-2'-(p-fluoro-
  phenyl)-4,6-pregnadieno-[3,2-c]pyrazole,
11β,21-dihydroxy-16β-methyl-20-oxo-2'-(p-fluoro-
  phenyl)-4,6-pregnadieno-[3,2-c]pyrazole,
9α-fluoro-11β,21-dihydroxy-6,16-dimethyl-20-oxo-
  2'-(p-fluorophenyl)-4,6-pregnadieno-
  [3,2-c]pyrazole,
and the 21-chloro-, 21-fluoro-, 21-carboxylic acylates and
21-phosphates of all the foregoing compounds,
20-oxo-4-pregneno-[3,2-c]pyrazole,
20-oxo-5-pregnano-[3,2-c]pyrazole,
6α-fluoro-20-oxo-4-pregneno-[3,2-c]pyrazole,
6α-methyl-20-oxo-4-pregneno-[3,2-c]pyrazole,
16α-methyl-20-oxo-4-pregneno-[3,2-c]pyrazole,
16β-methyl-20-oxo-4-pregneno-[3,2-c]pyrazole,
16-methylene-20-oxo-4-pregneno-[3,2-c]pyrazole,
20-oxo-2'-phenyl-4-pregneno-[3,2-c]pyrazole,
20-oxo-2'-phenyl-5-pregnano-[3,2-c]pyrazole,
6α-fluoro-20-oxo-2'-phenyl-4-pregneno-[3,2-c]
  pyrazole,
6α-methyl-20-oxo-2'-phenyl-4-pregneno-[3,2-c]
  pyrazole,
16α-methyl-20-oxo-2'-phenyl-4-pregneno-[3.2-c]
  pyrazole,
16β-methyl-20-oxo-2'-phenyl-4-pregneno-
  [3,2-c]pyrazole,
16-methylene-20-oxo-2'-phenyl-4-pregneno-
  [3,2-c]pyrazole,
20-oxo-2'-(p-fluorophenyl)-4-pregneno-[3,2-c]-
  pyrazole,
6α-fluoro-20-oxo-2'-(p-fluorophenyl)-4-pregneno-
  [3,2-c]pyrazole,
6α-methyl-20-oxo-2'-(p-fluorophenyl)-4-pregneno-
  [3,2-c]pyrazole,
16α-methyl-20-oxo-2'-p-fluorophenyl)-
  [3,2-c]pyrazole,
16β-methyl-20-oxo-2'-(p-fluorophenyl)-4-pregneno-
  [3,2-c]pyrazole,
16-methylene-20-oxo-2'-(p-fluorophenyl)-4-pregneno-
  [3,2-c]pyrazole,
20-oxo-4,6-pregnadieno-[3,2-c]pyrazole,
6-fluoro-20-oxo-4,6-pregnadieno-[3,2-c]pyrazole,
6-methyl-20-oxo-4,6-pregnadieno-[3,2-c]pyrazole,
16α-methyl-20-oxo-4,6-pregnadieno-[3,2c]pyrazole,
16β-methyl-20-oxo-4,6-pregnadieno-[3,2-c]pyrazole,
16-methylene-20-oxo-4,6-pregnadieno-[3,2-c]pyrazole,
6-fluoro-20-oxo-2'-phenyl-4,6-pregnadieno-[3,2-c]
  pyrazole,
6-methyl-20-oxo-2'-phenyl-4,6-pregnadieno-[3,2-c]
  pyrazole,
16α-methyl-20-oxo-2'-phenyl-4,6-pregnadieno-[3,2-c]
  pyrazole,
16β-methyl-20-oxo-2'-phenyl-4,6-pregnadieno-[3,2-c]
  pyrazole,
16-methylene-20-oxo-2'-phenyl-4,6-pregnadieno-[3,2-c]
  pyrazole,
20-oxo-2'-(p-fluorophenyl)-4,6-pregnadieno-[3,2-c]
  pyrazole,
6-fluoro-20-oxo-2'-(p-fluorophenyl)-4,6-pregnadieno-
  [3,2-c]pyrazole,
6-methyl-20-oxo-2'-(p-fluorophenyl)-4,6-pregnadieno-
  [3,2-c]pyrazole,
16α-methyl-20-oxo-2'-(p-fluorophenyl)-4,6-pregnadieno-
  [3,2-c]pyrazole,
16β-methyl-20-oxo-2'-(p-fluorophenyl)-4,6-pregnadieno-
  [3,2-c]pyrazole,
16-methylene-20-oxo-2'-(p-fluorophenyl)-4,6-pregna-
  dieno-[3,2-c]pyrazole,
11β-hydroxy-20-oxo-4-pregneno-[3,2-c]pyrazole,
9α-fluoro-11β-hydroxy-20-oxo-5-pregnano-[3,2-c]
  pyrazole,
9α-fluoro-11β-hydroxy-20-oxo-4-pregneno-[3,2-c]
  pyrazole,
11β-hydroxy-6α-methyl-20-oxo-4-pregneno-[3,2-c]
  pyrazole, 11β-hydroxy-16α-methyl-20-oxo-4-pregneno-[3,2-c]
pyrazole,
11β-hydroxy-16β-methyl-20-oxo-4-pregneno-[3,2-c]
pyrazole,
11β-hydroxy-6-methylene-20-oxo-4-pregneno-[3,2-c]
pyrazole,
11β-hydroxy-20-oxo-2'-phenyl-4-pregneno-[3,2-c]
pyrazole,
9α-fluoro-11β-hydroxy-20-oxo-2'-phenyl-4-pregneno-
[3,2-c]pyrazole,
11β-hydroxy-6α-methyl-20-oxo-2'-phenyl-4-pregneno-
[3,2-c]pyrazole,
11β-hydroxy-16α-methyl-20-oxo-2'-phenyl-4-pregneno-
[3,2-c]pyrazole,
11β-hydroxy-16β-methyl-20-oxo-2'-phenyl-4-pregneno-
[3,2-c]pyrazole,
11β-hydroxy-6α,16α-dimethyl-20-oxo-2'-phenyl-4-
pregneno-[3,2-c]pyrazole,
11β-hydroxy-20-oxo-2'-(p-fluorophenyl)-4-pregneno-
[3,2-c]pyrazole,
9α-fluoro-11β-hydroxy-20-oxo-2'-(p-fluorophenyl)-4-
pregneno-[3,2-c]pyrazole,
11β-hydroxy-6α,16α-dimethyl-20-oxo-2'-(p-fluorophenyl)-
4-pregneno-[3,2-c]pyrazole,
11β-hydroxy-16α-methyl-20-oxo-2'-(p-fluorophenyl)-4-
pregneno-[3,2-c]pyrazole,
11β-hydroxy-16β-methyl-20-oxo-2'-(p-fluorophenyl)-4-
pregneno-[3,2-c]pyrazole,
11β-hydroxy-20-oxo-4,6-pregnadieno-[3,2-c]pyrazole,
9α-fluoro-11β-hydroxy-20-oxo-4,6-pregnadieno-[3,2-c]
pyrazole,
6-fluoro-11β-hydroxy-20-oxo-4,6-pregnadieno-[3,2-c]
pyrazole,
11β-hydroxy-6-methyl-20-oxo-4,6-pregnadieno-[3,2-c]
pyrazole,
11β-hydroxy-16α-methyl-20-oxo-4,6-pregnadieno-[3,2-c]
pyrazole,
11β-hydroxy-16β-methyl-20-oxo-4,6-pregnadieno-[3,2-c]
pyrazole,
11β-hydroxy-16-methylene-20-oxo-4,6-pregnadieno-
[3,2-c]pyrazole,
9α-fluoro-11β-hydroxy-20-oxo-2'-phenyl-4,6-pregnadieno-
[3,2-c]pyrazole,
6-fluoro-11β-hydroxy-20-oxo-2'-phenyl-4,6-pregnadieno-
[3,2-c]pyrazole,
11β-hydroxy-6-methyl-20-oxo-2'-phenyl-4,6-pregnadieno-
[3,2-c]pyrazole,
11β-hydroxy-16α-methyl-20-oxo-2'-phenyl-4,6-
pregnadieno-[3,2-c]pyrazole,
11β-hydroxy-16β-methyl-20-oxo-2'-phenyl-4,6-
pregnadieno-[3,2-c]pyrazole,
11β-hydroxy-16-methylene-20-oxo-2'-phenyl-4,6-
pregnadieno-[3,2-c]pyrazole,
11β-hydroxy-20-oxo-2'-(p-fluorophenyl)-4,6-
pregnadieno-[3,2-c]pyrazole,
9α-fluoro-11β-hydroxy-20-oxo-2'-(p-fluorophenyl)-4,6-
pregnadieno-[3,2-c]pyrazole,
6-fluoro-11β-hydroxy-20-oxo-2'-(p-fluorophenyl)-4,6-
pregnadieno-[3,2-c]pyrazole,
11β-hydroxy-6-methyl-20-oxo-2'-(p-fluorophenyl)-4,6-
pregnadieno-[3,2-c]pyrazole,
11β-hydroxy-16α-methyl-20-oxo-2'-(p-fluorophenyl)-4,6-
pregnadieno-[3,2-c]pyrazole,
11β-hydroxy-16β-methyl-20-oxo-2'-(p-fluorophenyl)-4,6-
pregnadieno-[3,2-c]pyrazole,
9α-fluoro-11β-hydroxy-6,16-dimethyl-20-oxo-2'-(p-
fluorophenyl)-4,6-pregnadieno-[3,2-c]pyrazole, and the 1'- and 2'-alkyl-, 1'- and 2'-aralkyl-, 1'- and 2'-cycloalkyl-, and other 1'- and 2'-aryl analogues, particularly 2'-phenyl-2-p-fluorophenyl, and 2'-pyridyl, of all the foregoing compounds.

The 11β,17α - dihydroxy-4-pregneno-(and 4,6-pregnadieno)-[3,2-c]pyrazoles represented by Compound 1 of Flow Sheet A are known compounds.

The 17α-hydroxy-4-pregneno-, (and 4,6-pregnadieno)-[3,2-c]pyrazole starting materials which have only hydrogen at the 11-position can be prepared by the synthesis outlined in the "Flow Sheet of Starting Materials," as specifically described in Example 4. In the Flow Sheet of Starting Materials, Compound 13 having only hydrogen at the 11-position can be prepared by the introduction of the various substituents, namely the 16α-methyl-, 16β-methyl-, 16-methylene-, 6α-fluoro-, or the 6α-methyl-groups into the known 17α,21-dihydroxy-4-pregnene-3,20-dione following known procedures capable of general application. More than one substituent may be introduced into the unsubstituted steroid in any order. The Δ⁴ steroid represented by Compound 13 can be converted into the corresponding Δ⁴,⁶-steroid by well-known procedures.

The 17α,21-dihydroxy-4 - pregnene - 3,20 - dione compounds represented by Compound 13, and likewise the corresponding 11β-hydroxy compounds, can be hydrogenated to form the corresponding 17α,21-dihydroxy-5α-pregnane-3,20-dione analogues, for example, by catalytic hydrogenation using 5% Pd/BaSo₄ as catalyst, at room temperature and a hydrogen pressure of about 30 pounds p.s.i. The product formed is predominately the 5-α-pregnane (AB trans) which may be mixed with some (AB cis) form. The 5α-pregnane may be separated, if necessary, by chromatography and crystallization. This process is specifically described by the first procedure in Example 5.

If the novel compounds of this invention are to have an 11-keto group, it is preferred that the starting compounds have an 11-keto group, but the 11β-hydroxy-group of 11β-hydroxy-20-oxo-4-pregneno - 4,6 - pregnadieno- or pregnane-[3,2-c]pyrazole compounds which do not have an unprotected primary or additional secondary alcohol or an aldehyde group can be oxidized to form the corresponding 11-ketoanalogues, for example, by adding the compound to be oxidized to a cold solution of chromium trioxide in pyridine prepared by cautious addition of chromium trioxide to cold pyridine. After standing overnight, the reaction mixture is poured into water and extracted with a suitable solvent, such as ethyl acetate. The extract is washed with a mineral acid, preferably N sulfuric acid and then with water until neutral, dried over magnesium sulfate and filtered. The solvent is removed by distillation under reduced pressure. The residue is the 11, 20-dioxo-4-pregneno-4,6-pregnadieno- or pregnane-[3,2-c]pyrazole and may be purified by chromatographing a benzene solution thereof on to basic alumina and elution with a benzene-chloroform solvent.

FLOW SHEET A

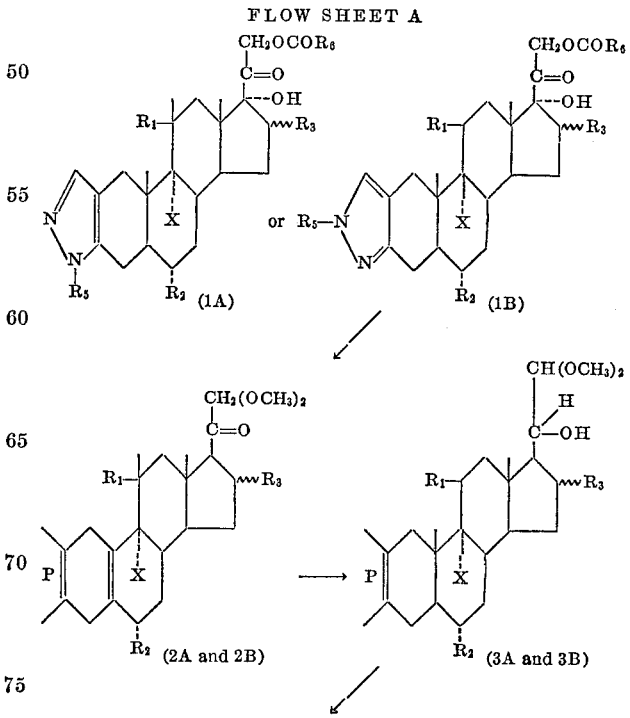

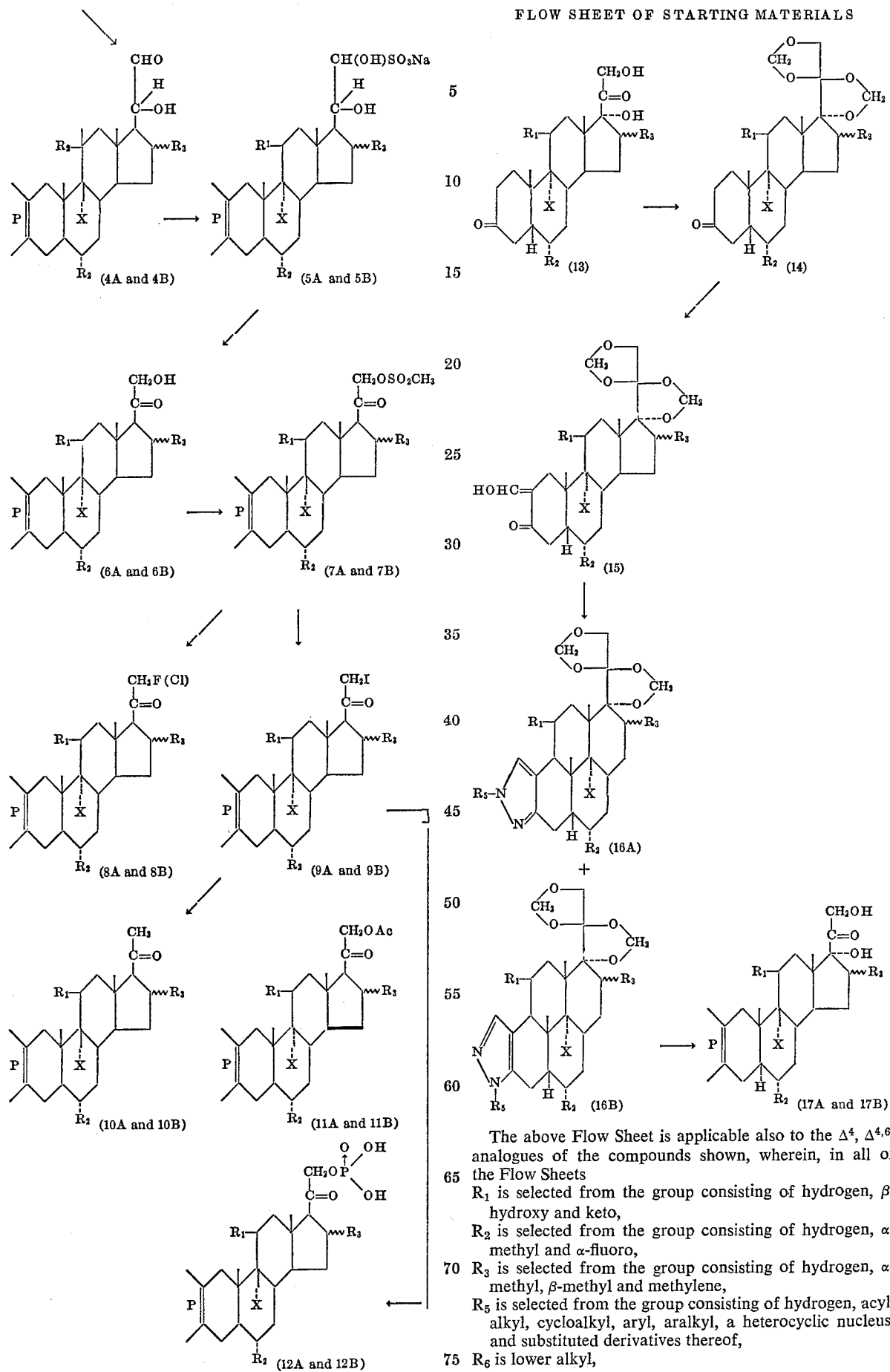

FLOW SHEET OF STARTING MATERIALS

The above Flow Sheet is applicable also to the $\Delta^4$, $\Delta^{4,6}$-analogues of the compounds shown, wherein, in all of the Flow Sheets $R_1$ is selected from the group consisting of hydrogen, $\beta$-hydroxy and keto, $R_2$ is selected from the group consisting of hydrogen, $\alpha$-methyl and $\alpha$-fluoro, $R_3$ is selected from the group consisting of hydrogen, $\alpha$-methyl, $\beta$-methyl and methylene, $R_5$ is selected from the group consisting of hydrogen, acyl, alkyl, cycloalkyl, aryl, aralkyl, a heterocyclic nucleus, and substituted derivatives thereof, $R_6$ is lower alkyl, As is lower hydrocarbon acyloxy, and X is selected from the group consisting of hydrogen and fluoro, but X is fluoro only when $R_1$ is β-hydroxy and keto, and the broken ring designated as "P" is the pyrazole ring, the structure of the pyrazole ring in the "A" compounds being the same as that of Compound 1A, and the structure of the pyrazole ring in the "B" Compounds being the same as that of Compound 1B.

The following examples illustrate methods of carrying out the present invention but it is to be understood that these examples are given for purposes of illustration and not of limitation.

EXAMPLE 1

The following procedures are particularly described starting with 11β,17α-21-trihydroxy - 20 - oxo-2'-phenyl-4-pregneno-[3,2-c]pyrazole, but are generally applicable to all of the starting materials defined by Compound 1 of Flow Sheet A.

11β,17α,21-Trihydroxy - 20 - oxo - 2' - phenyl-4-pregneno-[3,2-c]pyrazole (11.0 gms.) is suspended in a solution of dry methanolic hydrogen chloride (400 ml., 0.52 N). After 10 minutes of agitation the material dissolves completely to give a solution which is kept at 25 C. for 48 hours. Sodium acetate (22 gms.) in water (60 ml.) is added and the solvent is removed under vacuum to a volume of 75 ml. Water (100 ml.) is added and the mixture is extracted several times with chloroform. The chloroform extract is washed with dilute aqueous sodium carbonate and saturated salt solution and then dried over sodium sulfate. The solution is evaporated to give a solid residue which is recrystallized from a solvent to gvie 11β-hydroxy-20-oxo-2'-phenyl - 4 - pregneno - [3,2-c]pyrazole-21-al dimethyl acetal.

The above product (5.5 gms.) is added to a stirred suspension of sodium borohydride (5 gms.) in aqueous tetrahydrofuran (250 ml.). The mixture is allowed to stir at room temperature overnight. It is then poured into aqueous sodium dihydrogen phosphate solution and the mixture extracted with chloroform. The organic phase is washed with water adn evaporated to dryness under vacuum. Crystallization of the residue affords 11β-,20-dihydroxy-2'-phenyl-4-pregneno-[3,2 - c]pyrazole - 21 - al dimethyl acetal.

11β,20-Dihydroxy-2'-phenyl - 4 - pregneno - [3,2-c]-pyrazole-21-al dimethyl acetal (1.0 g.) 5 in 50% aqueous acetic acid (20 ml.) is kept at 90 to 95° C. for 3 hours. The mixture is cooled to 20° C., water is added, and the mixture is extracted with chloroform. The chloroform extract is washed first with aqueous sodium bicarbonate, and then with water. The extract is then dried over sodium sulfate. The solvent is removed by evaporation under vacuum and the residue is recrystallized to give 11β,20-dihydroxy-2'-phenyl-4-pregneno-[3,2-c]pyrazole - 21 -al.

To 11β,20-dihydroxy-2'-phenyl - 4 - pregneno - [3,2-c] pyrazole-21-al (0.6 gms.) in methanol (40 ml.) is added sodium bisulfite (250 mg.) in water (15 ml.). The slightly turbid mixture is kept at 25° C. for 1 hour, and then concentrated under vacuum at 20–30° C. until a granular precipitate appears. Water (50 ml.) is added and the concentration continued until the methanol has been removed completely. The precipitate is filtered, washed with water and dried. The colorless filtrate and washings are concentrated under vacuum to dryness. The water-soluble amorphous precipitate is triturated with absolute ethanol, and the unreacted sodium bisulfite is removed by filtration. The precipitate is the 11β,20-dihydroxy-2'-phenyl-4-pregneno-[3,2 - c]pyrazole - 21 - al sodium bisulfite addition product.

To 11β,20-dihydroxy-2'-phenyl-4 - pregneno - [3,2 - c] pyrazole-21-al sodium bisulfite addition product (80 mg.) in methanol (5.0 ml.) is added freshly prepared methanolic sodium methoxide (10 ml., 0.5 N) under nitrogen. The solution is stirred at 22° C. for 30 minutes. Addition of acetic acid (0.5 ml.) neutralizes the alkali and discharges the color. Most of the solvent is removed under vacuum, water is added and the mixture is extracted with chloroform. The chloroform extract is washed first with dilute aqueous sodium bicarbonate and then with water. The extract is then dried over sodium sulfate. Evaporation of the solvent gives a residue which is crystallized to afford 11β,21-dihydroxy-20-oxo-2'-phenyl - 4 - pregneno-[3,2-c]pyrazole.

EXAMPLE 2

The following procedures are particularly described starting with 11β,21-dihydroxy-20-oxo - 2' - phenyl - 4-pregneno[3,2-c]pyrazole, but are generally applicable to all the starting materials defined by Compound 6 of Flow Sheet A wherein $R_5$ is a substituent other than hydrogen.

The 11β,21-dihydroxy-20-oxo-2'-phenyl - 4 - pregneno-[3,2-c]pyrazole (100 mg.) is dissolved in 1.2 cc. of dimethylformamide. The solution is cooled to 0° C. and 0.07 cc. of methane sulfonyl chloride is added. The mixture is kep at 0° C. for about one hour, 3 cc. of water is added and the product is extracted into 100 cc. of chloroform, washed with water, dried over sodium sulfate, and taken to dryness to afford the 11β,21-dihydroxy-20-oxo-2'-phenyl-4-pregneno-[3,2-c]pyrazole-21-mesylate.

To a solution of 62 mg. of the above product in 1 ml. of freshly distilled anhydrous dimethylformamide is added enough anhydrous potassium fluoride to assure a saturated solution. The mixture is heated at 110° C. for 20 hours. Water is added to the cooled solution, and the product is extracted into chloroform, dried over sodium sulfate, and evaporated to dryness to afford 21-fluoro-11β-hydroxy-20-ovo-2'-phenyl-4-pregneno-[3,2-c]pyrazole.

A mixture of 11β,21-dihydroxy-20-oxo-2' - phenyl - 4-pregneno-[3,2-c]pyrazole-21-mesylate (0.75 g.), lithium chloride (202 mg.) and dimethylformamide (30 ml.) are heated under reflux for 50 minutes, concentrated under vacuum to a small volume, and treated with water. The solid so formed is separated by filtration and recrystallized to afford the 21 - chloro - 11β,21 - dihydroxy - 20 - oxo-2'-phenyl-4-pregneno-[3,2-c]pyrazole.

The 11β,21-dihydroxy-20-oxo-2'-phenyl - 4 - pregneno-[3,2-c]pyrazole - 21 - mesylate is suspended in 5.5 cc. of acetone and 117 mg. of sodium iodide is added. The mixture is refluxed under nitrogen for about one hour. It is then cooled on ice. On the addition of water there is formed a white precipitate which is filtered off, washed with water, and dried under vacuum to give the 11β-hydroxy-21-iodo-20-oxo-2'-phenyl - 4 - pregneno - [3,2-c] pyrazole.

The above material is dissolved in 5 cc. of ethanol. Five hundred mg. of sodium bisulfite in 5 cc. of water is added, and the mixture is refluxed for one hour under nitrogen. Ten cc. of water is then added and the product is extracted into 100 cc. of chloroform, washed with water, dried over sodium sulfate and taken to dryness, to give a residue which is purified by chromatography on silica gel. The 11β-hydroxy-20-oxo-2'-phenyl-4-pregneno-[3,2-c]pyrazole so obtained is crystallized from acetone-ether.

Silver dihydrogen phosphate is prepared by the reaction of 32 g. of trisilver phosphate with 10 ml. of 100% phosphoric acid with thorough mixing in a one-liter 3-necked round-bottomed flask. The silver dihydrogen phosphate is washed with two portions of diethyl ether, which are removed by decantation, to remove some of the phosphoric acid. About 200 ml. of acetonitrile are added to cover the silver dihydrogen phosphate, and the mixture is heated to reflux temperature. At this point 20 g. of 11β-hydroxy-21-iodo-20-oxo-2'-phenyl - 4 - pregneno - [3,2-c] pyrazole is added and the mixture is refluxed in a nitrogen atmosphere with stirring for 75 minutes. The reaction mixture is then cooled over a period of about one hour to room temperature. Then 200 g. of ice water are added, and the acetonitrile is removed under vacuum at a temperature below 25° C. The pH of the resulting aqueous suspension is adjusted to 6.4 by the addition of 23 ml. of saturated aqueous sodium carbonate solution. A precipitate is formed and separated by filtration. The precipitate is washed with water until no ultraviolet absorbing material is detected in the wash water. The filtrate and wash water are combined and freeze-dried to separate a solid material from the water. The solid material is triturated with a total of 770 ml. of methanol in seven portions. The methanol-insoluble material is separated by filtration. The filtrate is then concentrated under vacuum to 200 ml. and passed through a column containing 60 g. of a cation exchange resin ("IR–120") in its hydrogen form. The column is washed with methanol until the washings contain no ultraviolet absorbing material. The combined eluate and washings are concentrated to a volume of 15 ml., and 150 ml. of ether are added. The precipitate which forms is recovered by filtration, washed with ether, and dried for about 16 hours in a desiccator, to give 11$\beta$-hydroxy-20-oxo - 2' - phenyl - 4 - pregneno-[3,2-c]pyrazole 21-dihydrogen phosphate.

The mono- and the dialkali metal salts of the 21-dihydrogen phosphate compound are obtained by neutralizing the 21-dihydrogen phosphate ester with an alkali metal methoxide.

To a solution of 100 mg. of 11$\beta$,21-dihydroxy-20-oxo-2'-phenyl-4-pregneno-[3,2-c]pyrazole in 2 ml. of pyridine is added 0.5 ml. of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 $N$ sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The 11$\beta$,21-dihydroxy-20-oxo-2'-phenyl-4-pregneno-[3,2-c]pyrazole 21-acetate is isolated by the addition of water and filtration.

In accordance with the above procedure, but using another hydrocarbon carboxylic acid acylating agent such as benzoic anhydride, or tertiary butyl acetyl chloride; a lower alkanoyl anhydride or halide such as propionic anhydride or acetyl chloride; or a polybasic anhydride such as $\beta,\beta$-dimethylglutaric anhydride, succinic anhydride or the like, the corresponding 21-carboxylic acid anhydride is obtained.

EXAMPLE 3

The following procedures are particularly described starting with 11$\beta$,21-dihydroxy-20-oxo-4-pregneno-[3,2-c]pyrazole, but are generally applicable to all of the starting materials defined by Compound 6 of the Flow Sheet A wherein $R_5$ is hydrogen.

To a solution of 100 mg. of 11$\beta$,21-dihydroxy-20-oxo-4-pregnene-[3,2-c]pyrazole in 2 ml. of pyridine is added two milliequivalents of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 $N$ sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The N - acetyl-11$\beta$,21-dihydroxy-20-oxo-4-pregneno-[3,2-c]pyrazole 21-acetate is then isolated by addition of water and filtration.

In accordance with the above procedure, but using another hydrocarbon carboxylic acid acylating agent such as benzoic anhydride, tertiary butyl acetyl chloride, a lower alkanoyl anhydride or halide such as propionic anhydride or acetyl chloride, or a polybasic anhydride such as $\beta,\beta$-dimethylglutaric anhydride, succinic anhydride or the like, the corresponding 21-carboxylic acid anhydride is obtained.

A solution of 5.73 g. of N-acetyl-11$\beta$,21-dihydroxy-20-oxo-4-pregneno-[3,2-c]pyrazole 21-acetate in 60 ml. of 80% (v./v) acetic acid is refluxed for 1.5 hours. This solution is diluted with 400 ml. of ice-water and extracted with ethyl acetate. The ethyl acetate extract is washed with water and with saturated sodium bicarbonate solution, dried, and evaporated to dryness under vacuum. Recrystallization of the resulting product affords 11$\beta$,21-dihydroxy-20-oxo-4-pregneno-[3,2-c]pyrazole 21-acetate.

To a solution of 3.70 g. of the above product in 150 ml. of methanol there is added 30 ml. of water containing 0.01 mole of hydrogen chloride. Then a solution of 0.81 g. of potassium cyanate in 8 ml. of water is added and this mixture is left overnight at room temperature. Some of the methanol is removed under vacuum on the rotating evaporator; more water is added and the precipitate is collected by filtration. Recrystallization from methanol gives the N-carbamyl-pyrazole in sufficient purity for the next step.

A 500 mg. aliquot of the N-carbamyl-11$\beta$,21-dihydroxy-20-oxo-4-pregneno-[3,2-c]pyrazole 21-acetate is dissolved in 2.4 ml. of pure methanol and allowed to react with 0.5 ml. of a 1.33 $N$ solution of sodium methoxide in methanol at room temperature under nitrogen atmosphere for ten minutes. The alkoxide is neutralized with acetic acid and the mixture is then taken to dryness and flushed with n-hexane. The residue is washed with water, filtered and dried to constant weight to give N-carbamyl-11$\beta$,21-dihydroxy-20-oxo-4-pregneno-[3,2-c]pyrazole.

To a solution of 85 mg. of the above product in 0.5 ml. of pyridine, cooled to 0° C., is added 0.015 ml. of methane sulfonyl chloride. The resulting mixture is allowed to stand at a temperature of approximately 0° C. for a period of approximately one hour. Water is then added to the reaction mixture and the precipitate which forms is recovered by filtration, washed with water, and dried to give N - carbamyl-11$\beta$,21-dihydroxy-20-oxo-4-pregneno-[3,2-c]pyrazole 21-mesylate.

A mixture of N-carbamyl-11$\beta$,21-dihydroxy-20-oxo-4-pregneno-[3,2-c]pyrazole 21-mesylate (0.75 g.), lithium chloride (202 mg.) and dimethylformamide (30 ml.) are heated under reflux for 50 minutes, concentrated under vacuum to a small volume, and treated with water. The solid so formed is separated by filtration and recrystallized to afford the N-carbamyl-21-chloro-11$\beta$-hydroxy-20-oxo-4-pregneno-[3,2-c]pyrazole.

To a solution of 62 mg. of N-carbamyl-11$\beta$,21-dihydroxy-20-oxo-4-pregneno-[3,2-c]pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness to afford the N-carbamyl - 21 - fluoro-11$\beta$-hydroxy-20-oxo-4-pregneno-[3,2,-c]pyrazole.

To 180 mg. of N-carbamyl-11$\beta$,21-dihydroxy-20-oxo-4-pregneno-[3,2-c]pyrazole 21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give N-carbamyl-11$\beta$-hydroxy-21-iodo-20-oxo-4-pregneno-[3,2-c]pyrazole.

The N - carbamyl-11$\beta$-hydroxy-21-iodo-20-oxo-4-pregneno-[3,2-c]pyrazole (200 mg.) is dissolved in a mixture of 5 ml. of water and 5 ml. of ethanol. To the resulting suspension is added 500 mg. of sodium bisulfite, and the mixture is heated under reflux for a period of 1 hour. The reaction solution is cooled, diluted with water, and the material which separates is recovered by filtration. The product is washed with water, dried and recrystallized from ethyl acetate to give N-carbamyl-11β-hydroxy-20-oxo-4-pregneno-[3,2-c]pyrazole.

Silver dihydrogen phosphate is prepared by the reaction of 32 g. of trisilver phosphate with 10 ml. of 100% phosphoric acid with thorough mixing in a one-liter 3-necked round-bottomed flask. The silver dihydrogen phosphate is washed with two portions of diethyl ether, which are removed by decantation, to remove some of the phosphoric acid. About 200 ml. of acetonitrile are added to cover the silver dihydrogen phosphate, and the mixture is heated to reflux temperature. At this point 20 g. of N-carbamyl-11β - hydroxy-21-iodo-20-oxo-4-pregneno-[3,2-c]pyrazole is added and the mixture is refluxed in a nitrogen atmosphere with stirring for 75 minutes. The reaction mixture is then cooled over a period of about one hour to room temperature. Then 200 g. of ice water are added, and the acetonitrile is removed under vacuum at a temperature below 25° C. The pH of the resulting aqueous suspension is adjusted to 6.4 by the addition of 23 ml. of saturated aqueous sodium carbonate solution. A precipitate is formed and separated by filtration. The precipitate is washed with water until no ultra-violet absorbing material is detected in the wash water. The filtrate and wash water are combined and freeze dried to separate a solid material from the water. The solid material is triturated with a total of 770 ml. of methanol in seven portions. The methanol-insoluble material is separated by filtration. The filtrate is then concentrated under vacuum to 200 ml. and passed through a column containing 60 g. of cation exchange resin ("IR-120") in its hydrogen form. The column is washed with methanol until the washings contain no ultraviolet absorbing material. The combined eluate and washings are concentrated to a volume of 15 ml., and 150 ml. of ether are added. The precipitate which forms is recovered by filtration, washed with ether, and dried for about 16 hours in a desiccator, to give N- carbamyl - 11β-hydroxy-20-oxo-4-pregneno-[3,2-c]pyrazole 21-dihydrogen phosphate.

The mono- and the dialkali metal salts of the 21-dihydrogen phosphate compound are obtained by neutralizing the 21-dihydrogen phosphate ester with an alkali metal methoxide.

To a solution of 355 mg. of N-carbamyl-11β-hydroxy-20-oxo-41pregneno-[3,2-c]pyrazole in 35 ml. of glacial acitic acid there is added slowly with stirring 104 mg. of sodium nitrite in 5 ml. of water. After fifteen minutes at room temperature, most of the acetic acid is removed under room temperature on the rotating evaporator. Ethyl acetate is added and this solution is extracted several times with sodium bicarbonate and then dried. Removal of the solvent, followed by chromatography on alumina, affords 11β-hydroxy-20-oxo-4-pregneno-[3,2-c]pyrazole.

In accordance with the above procedure, but starting with the N - carbamyl - 21 - fluoro - (or 21 - chloro) - 11β - hydroxy - 20 - oxo - 4 - pregneno - [3,2 - c]pyrazole there is obtained the 21-fluoro-(or 21-chloro)-11β-hydroxy-20-oxo-4-pregneno-[3,2-c]pyrazole.

EXAMPLE 4

The following procedures are particularly described for the preparation of 17α,21-dihydroxy-16α-methyl-4-pregneno-[3,2-c]pyrazole, and its 2'-phenyl and 2'-p-fluorophenyl-derivatives, but are generally applicable for the preparation of all of the 11-desoxy-steroids of Compound 17 of the Flow Sheet of Starting Materials.

To a suspension of 25.0 g. of 17α,21-dihydroxy-16α-methyl-4-pregnene-3,20-dione in 1.5 liter of alcohol-free chloroform cooled to about 5° C. in an ice bath is added with constant stirring 750 ml. of cold, concentrated hydrochloric acid and then 750 ml. of formalin (low in methanol). The mixture is removed from the ice bath and stirred at room temperature for 7 hours. The layers are separated and the aqueous phase is back-extracted twice with chloroform. The combined organic layers are washed twice with a 5% solution of sodium bicarbonate, and twice with a saturated salt solution. The solution is dried over magnesium sulfate and evaporated to dryness under reduced pressure. The residue is triturated with methanol to afford a crystalline solid. This material contains no detectable amount of starting material by paper-strip chromatography but shows two U.V. absorbing spots near the solvent front (methanol-formamide 2:1 vs. benzene-n-hexane 1:1). A 2.425 g. aliquot is recrystallized three times from a mixture of benzene and n-hexane to give 17α,20,20,21 - bis(methylenedioxy) - 16α - methyl - 4-pregnene-3-one which is used in the subsequent steps of the synthesis without further purification.

The 17α,20,20,21-bis(methylenedioxy) - 16α - methyl-4-pregnene-3-one (1.350 g.) is dissolved in 23 ml. of dry, hot benzene and the resulting solution is cooled to room temperature and treated with 0.96 ml. of freshly distilled ethyl formate. The air in the system is replaced with nitrogen and 560 mg. of sodium hydride (as a 58% dispersion in mineral oil) is added. The system is again evacuated and filled with nitrogen, and the mixture is stirred magnetically at room temperature overnight. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as the sodium salt by extraction into a 10% solution of sodium carbonate. The aqueous alkaline extracts are again acidified with an excess of a saturated aqueous solution of sodium dihydrogen phosphate and extracted into ether and into chloroform. The combined organic extracts are dried over sodium sulfate and evaporated to dryness to give 17α,20,20,21 - bis(methylenedioxy) - 2 - hydroxymethylene - 16α - methyl-4-pregnene-3-one.

The 17α,20,20,21 - bis(methylenedioxy) - 2 - hydroxymethylene - 16α - methyl - 4 - pregnene - 3 - one (850 mg.) is dissolved in 9.2 ml. of absolute ethanol and treated with a solution of 0.16 ml. of hydrazine hydrate dissolved in 0.16 ml. of absolute ethanol. The mixture is refluxed in a nitrogen atmosphere for about 45 minutes and then evaporated to dryness under reduced pressure. The residue is washed three times with cold water and the resulting amorphous solid is dried at 80° C. for 1 hour in high vacuum to give 17α,20,20,21-bis(methylenedioxy)-16α-methyl-4-pregneno-[3,2-c]pyrazole.

At 111.5 mg. sample of 17α,20,20,21-bis(methylenedioxy) - 2 - hydroxymethylene - 16α - methyl - 4 - pregnene - 3-one is suspended in 2.5 ml. of ethanol and treated with 24.5 mg. of sodium acetate, followed with the addition of 48.5 mg. of p-fluorophenylhydrazine hydrochloride. The air in the system is replaced with nitrogen and the mixture is quickly brought to reflux temperature. After refluxing for one hour the mixture is taken to dryness. The residue is dissolved in ether, the ether layer is treated three times with 2.5 N hydrochloric acid, then three times with 2.5 N sodium hydroxide and finally with water. The ether layer is dried over magnesium sulfate, filtered and concentrated to dryness under vacuum to give a residue which has as its major component the 17α,20,20,21-bis(methylenedioxy) - 2' - (p-fluorophenyl) - 16α - methyl - 4-pregneno-[3,2-c]pyrazole. The latter compound is recovered by dissolving the reaction mixture in methanol and then recrystallizing.

A mixture of 90 mg. of 17α,20,20,21-bis(methylenedioxy) - 2 - hydroxymethylene - 16α - methyl - 4 - pregneno-3-one and 0.028 ml. of phenylhydrazine are refluxed under nitrogen in 1.2 ml. of absolute othanol for 50 minutes. The reaction mixture is taken to dryness. Water is added and the product is filtered to give an amorphous solid, which is washed successively with water, dilute acid, water, and petroleum ether. The product is crystallized from methanol to give 17α,20,20,21-bis(methylenedioxy)-16α-methyl-2'-phenyl-4-pregneno-[3,2-c]pyrazole.

A 30 mg. aliquot of 17α,20,20,21-bis(methylenedioxy)-16α-methyl-4-pregneno-[3,2-c]pyrazole is heated on a steam bath with 2 ml. of 60% formic acid for 35 minutes. The solvents are removed under vacuum, water is added and the product is filtered off to give a mixture of 17α,21-dihydroxy - 16α - methyl - 20 - oxo - 4 - pregneno - [3,2-c] pyrazole and its 21-formate. A 500 mg. aliquot of this crude product is dissolved in 2.4 ml. of pure methanol and allowed to react with 0.9 ml. of a 1.33 N solution of sodium methoxide in methanol at room temperature under a nitrogen atmosphere for 10 minutes. The alkoxide is neutralized with acetic acid and the mixture is then taken to dryness and flushed with n-hexane. The residue is washed with water, filtered and dried to constant weight to give 17α,21 - dihydroxy - 16α - methyl - 20 - oxo - 4 - pregneno-[3,2-c]pyrazole.

In accordance with the above procedure, but starting with the 2'-phenyl or the 2'-fluorophenyl-derivative of 17α,20,20,21 - bis(methylenedioxy) - 16α - methyl - 4 - pregneno-[3,2-c]pyrazole, the corresponding 2'-phenyl or 2' - p - fluorophenyl - 17α,21 - dihydroxy - 16α - methyl - 20-oxo-4-pregneno-[3,2-c]pyrazole is obtained. The 17α, 21 - dihydroxy - 16α - methyl - 20 - oxo - 4 - pregneno - [3,2-c]pyrazole or its 2'-phenyl or 2'-p-fluorophenyl-derivative is converted into the 21-hydroxy-16α-methyl-20-oxo-4-pregneno-[3,2-c]pyrazole, or its 2'-phenyl or 2'-p-fluorophenyl-derivative respectively, following the procedural steps outlined in Example 1, but starting with the respective 17α,21 - dihydroxy - 16α - methyl - 20 - oxo - 4 - pregneno-[3,2-c]pyrazole in place of the 11β,17α-21-trihydroxy-20-oxo-4-pregneno-[3,2-c]pyrazole.

EXAMPLE 5

The following procedures are particularly described for the preparation of 9α-fluoro-11β,17α,21-trihydroxy-16α-methyl - 20 - oxo-2'-phenyl-5α-pregnano-[3,2-c]pyrazole, but are generally applicable for the preparation of all of the 5α-pregnano - [3,2-c]-pyrazoles defined by Compound 17 of the Flow Sheet of Starting Materials.

When no 9α-fluoro-substituent is present the steps of first oxidizing an 11β-hydroxy-group to an 11-oxo-group (see col. 18) and later reducing the 11-oxo-group to the 11β-hydroxy-group (see Cols. 18–19) are omitted.

9α - Fluoro - 11β,17α,21 - trihydroxy-16α-methyl-4-pregnene-3,20-dione (50 g.), is dissolved in 350 ml. of methanol and 2–5 liters of benzene on a steam bath. The steroid is hydrogenated using as catalyst 45.0 g. of 5% Pd/BaSO₄ at room temperature and 30 pounds pressure for about 21 hours. The product is filtered and washed three times with a hot mixture of benzene and methanol. The filtrates and washes are concentrated under vacuum on a steam bath. The residue is flushed two times with acetone. The residue is dissolved in 2.1 liters of acetone and then concentrated to 250 ml. After standing overnight at 5° C. there is obtained the 9α-fluoro-11β,17α,21-trihydroxy-16α-methyl-5α-pregnane-3,20-dione.

A 5 g. sample of 9α-fluoro-11β,17α,21-trihydroxy-16α-methyl-5α-pregnane-3,20-dione is dissolved in a mixture of 235 ml. of chloroform and 150 ml. of methylene chloride, cooled in an ice bath with stirring and treated with 85 ml. of formaldehyde (37%). An equal volume (85 ml.) of cold concentrated hydrochloric acid is added from a funnel over a 5-minutes interval with stirring and cooling. The mixture is stirred at room temperature for four hours. The layers are separated and the organic layer is washed free of acid by washing three times with water and then with a 5% solution of sodium bicarbonate. The organic layers are washed free of bicarbonate, dried over magnesium sulfate and taken to dryness. The gummy residue is treated with enough hot methanol on a steam bath to effect trituration, and the resulting crystalline solid is separated by filtering the mixture while hot. (The filtrate is set aside and may deposit additional product overnight.) The crude product is dried to constant weight and purified by chromatography. The product is partially dissolved in 250 ml. of hot chloroform and diluted with an equal volume of hot benzene to complete solution. After cooling, the mixture is absorbed in 100 g. of basic alumina and eluted with benzene and chloroform to give 17α,20,20,21-bis(methylenedioxy) - 9α - fluoro-16α-methyl-11β-hydroxy-5α-pregnane-3-one.

The 17α,20,20,21 - bis(methylenedioxy) - 9α - fluoro-16α - methyl - 11β - hydroxy-5α-pregnane-3-one (3.25 g.) is dissolved in 76 ml. of dry pyridine and added to a cold solution prepared by the cautious addition of 3.25 g.) is dissolved in 76 ml. of dry pyridine and added to a cold solution prepared by the cautious addition of 3.25 g. of chromium trioxide (in portions) to 34.7 ml. of cold pyridine. The mixture is allowed to stand at room temperature overnight. The mixture is poured into water and extracted three times with ethyl acetate, avoiding excessive shaking especially during the third extraction. The combined ethyl acetate extracts are washed three times with 1 N sulfuric acid and then with water until neutral. The combined ethyl acetate extracts are dried over magnesium sulfate and taken to dryness to give 2.94 g. of product. The product is dissolved in benzene, adsorbed on basic alumina and eluted with 8:2 benzene: chloroform to give 17α,20,20,21 - bis(methylenedioxy) - 9α - fluoro-16α-methyl-5α-pregnane-3,11-dione.

A 2.60 g. sample of 17α,20,20,21-bis(methylenedioxy)-9α-fluoro - 16α - methyl-5α-pregnane-3,11-dione is dissolved in 95 ml. of dry benzene using dry equipment and treated with 2.43 ml. of freshly distilled ethyl formate. About 1.19 g. of a dispersion of sodium hydride in mineral oil (about 51%) is added, followed by about 1.19 g. of freshly prepared dry sodium methoxide (dried at about 175° C. oil pump for 4 hours). The air in the system is again replaced with nitrogen and the mixture, which turns yellow at once, is stirred at room temperature for one and one-half hours. At this point the color of the reaction mixture is a dark orange. The mixture is chilled in an ice bath and a cold, saturated solution of sodium dihydrogen phosphate is added gradually to decompose excess sodium hydride and neutralize the sodium methoxide. Ether is added and the layers are separated. The aqueous layers are back-extracted with ether and the combined organic layers are washed free of acid with water and then extracted three to four times with a 5% aqueous solution of sodium bicarbonate. These extracts are set aside. The product is now extracted four to five times with a cold 2% aqueous solution of sodium hydroxide. (In order to avoid emulsification, the aqueous alkali is gently poured into the separatory funnel and the layers are separated without shaking the funnel. The last two extracts may be shaken with care.) The dark liquor is back-extracted two times with ether, and finally acidified in the cold with saturated aqueous solution of sodium dihydrogen phosphate. The neutral ether-benzene fraction should be set aside and processed as described below. The product is extracted into ether, and the ether extracts are washed free of acid with a saturated solution of sodium chloride. After drying over magnesium sulfate, the ether solution is taken to dryness and the amorphous product is crystallized from methanol to give 17α,20,20,21-bis(methylenedioxy)-9α-fluoro-2-hydroxymethylene - 16α - methyl-5α-pregnane-3,11-dione. This material is satisfactory for use in the next step.

The above product (1.900 g.) is dissolved in a mixture of 50 ml. of chloroform and 200 ml. of n-propanol to form solution "A." Phenylhydrazine (2 ml.) is dissolved in 25 ml. of n-propanol to form solution "B." The air in the system is replaced with nitrogen and all solvents are nitrogen flushed. A mixture of 20 ml. of n-propanol and 2.5 ml. of solution "B" are heated to reflux. Then solution "A" and the remainder of solution "B" are added dropwise (ratio A:B 10:1) over a period of 45 minutes. The magnetically stirred solution is kept under a strong reflux. After a total reaction time of 100 minutes the solution is evaporated to dryness under vacuum. The crude reaction product is taken up in ether:-methylene chloride (8:1), and is then washed 4 times with 2.5 N hydrochloric acid and 3 times with 2 N potassium hydroxide solution. The 17α,20,20,21-bis(methylenedioxy)-16α - methyl - 11 - oxo-2'-phenyl-5α-pregnano-[3,2-c]pyrazole is separated by chromatography on acid washed alumina.

A 455 mg. aliquot of 17α,20,20,21-bis(methylenedioxy) - 9α - fluoro - 16α - methyl - 11 - oxo - 2' - phenyl-5α - pregnano - [3,2-c]pyrazole is suspended in 75 ml. of a solution of sodium borohydride in isopropanol which is prepared by suspending an excess of sodium borohydride in isopropanol, stirring vigorously for about 15 minutes, and filtering to separate the excess of sodium borohydride. To the suspension is added an 0.816 ml. aliquot of a solution of 0.55 ml. of triethylamine in 1.45 ml. of iopropanol. The mixture is stirred, and enough methylene chloride (about 30 ml.) is added, with cooling to make the system homogeneous. One drop of water (ca. ½₀ ml.) is added and the mixture is stirred in a nitrogen atmosphere at room temperature overnight. Insolubles generally separate out in the course of the reaction. The mixture is then cooled, and the excess of sodium borohydride is decomposed by the addition of cold 2.5 N hydrochloric acid. The mixture (pH ca. 5) is taken to dryness under vacuum and the residue is washed with water and dried to give 17α,20,20,21 - bis(methylenedioxy) - 9α - fluoro-11β - hydroxy - 16α - methyl - 2' - phenyl - 5α - pregnano-[3,2-c]pyrazole.

The following reaction is conducted under nitrogen and all solvents are nitrogen flushed. The 17α, 20,20,21-bis(methylenedioxy) - 9α - fluoro - 11β - hydroxy - 16α-methyl - 2' - phenyl - 5α - pregnano - [3,2-c]pyrazole (500 mg.) is heated on a steam bath with 50 ml. of a 60% aqueous solution of formic acid for 30 minutes. The clear solution is evaporated to dryness under vacuum. The clear solution is evaporated to dryness under vacuum. After twice flushing with benzene the resulting white foam is dissolved in 30 ml. of pure methanol and allowed to react with 27 mg. of sodium methylate at room temperature for 15 minutes. The sodium alkoxide is destroyed with a slight excess of acetic acid and the mixture is subsequently taken to dryness under vacuum. After flushing 4 times with benzene, a semi-crystalline material is obtained. An aliquot (280 mg.) is dissolved in ether:methylene chloride (10:1) and the solution is washed twice with saturated sodium bicarbonate solution and once with water. The 9α - fluoro - 11β,17α,21 - trihydroxy - 16α-methyl - 20 - oxo - 2' - phenyl - 5α - pregnano - [3,2-c] pyrazole is obtained.

The 9α - fluoro - 11β,17α,21 - trihydroxy - 16α - methyl-20 - oxo - 2' - phenyl - 5α - pregnano - [3,2-c]pyrazole is converted into the corresponding 11β,21 - dihydroxy-16α - methyl - 20 - oxo - 2' - phenyl - 5α - pregnano-[3,2-c]pyrazole following the procedural steps outlined in Example 1, but starting with the 9α - fluoro - 11β,17α, 21 - trihydroxy - 16α - methyl - 20 - oxo - 2' - phenyl-5α - pregnano - [3,2-c]pyrazole in place of the 11β,17α, 21 - trihydroxy - 20 - oxo - 2' - phenyl - 4 - pregneno-[3,2-c]pyrazole.

EXAMPLE 6

Following all of the procedures of Example 1, but utilizing as starting materials the following compounds in place of 11β,17α,21 - trihydroxy - 20 - oxo - 2' - phenyl-4-pregneno-[3,2-c]pyrazole:

11β,17α,21-trihydroxy-16α-methyl-20-oxo-2'-p-fluorophenyl-4-pregneno-[3,2-c]pyrazole;
11β,17α,21-trihydroxy-16β-methyl-20-oxo-2'-p-fluorophenyl-4-pregneno-[3,2-c]pyrazole;
11β,17α,21-trihydroxy-16-methylene-20-oxo-2'-p-fluorophenyl-4-pregneno-[3,2-c]pyrazole;
11β,17α,21-trihydroxy-6α-methyl-20-oxo-2'-p-fluorophenyl-4-pregneno-[3,2-c]pyrazole;
11β,17α,21-trihydroxy-6α,16α-dimethyl-20-oxo-2'-p-fluorophenyl-4-pregneno-[3,2-c]pyrazole;
11β,17α,21-trihydroxy-6α-16α-dimethyl-20-oxo-2'-phenyl-4-pregneno-[3,2-c]pyrazole;
9α-fluoro-11β,17α,21-trihydroxy-20-oxo-2'-p-fluorophenyl-4-pregneno-[3,2-c]pyrazole;
9α-fluoro-11β,17α,21-trihydroxy-16α-methyl-20-oxo-2'-p-fluorophenyl-4-pregneno-[3,2-c]pyrazole;
9α-fluoro-11β,17α,21-trihydroxy-6α-methyl-20-oxo-2'-p-fluorophenyl-4-pregneno-[3,2-c]pyrazole; and
11β,17α,21-trihydroxy-6,16α-dimethyl-20-oxo-2'-phenyl-4,6-pregnadieno-[3,2-c]pyrazole;

there is obtained:

11β,21-dihydroxy-16α-methyl-20-oxo-2'-p-fluorophenyl-4-pregneno-[3,2-c]pyrazole;
11β,21-dihydroxy-16β-methyl-20-oxo-2'-p-fluorophenyl-4-pregneno-[3,2-c]pyrazole;
11β,21-dihydroxy-16-methylene-20-oxo-2'-p-fluorophenyl-4-pregneno-[3,2-c]pyrazole;
11β,21-dihydroxy-6α-methyl-20-oxo-2'-fluorophenyl-4-pregneno-[3,2-c]pyrazole;
11β,21-dihydroxy-6α,16α-dimethyl-20-oxo-2'-p-fluorophenyl-4-pregneno-[3,2-c]pyrazole;
11β,21-dihydroxy-6α,16α-dimethyl-20-oxo-2'-phenyl-4-pregneno-[3,2-c]pyrazole;
9α-fluoro-11β,21-dihydroxy-20-oxo-2'-p-fluorophenyl-4-pregneno-[3,2-c]pyrazole;
9α-fluoro-11β,21-dihydroxy-16α-methyl-20-oxo-2'-p-fluorophenyl-4-pregneno-[3,2-c]pyrazole;
9α-fluoro-11β,21-dihydroxy-6α-methyl-20-oxo-2'-p-fluorophenyl-4-pregneno-[3,2-c]pyrazole; and
11β,21-dihydroxy-6,16α-dimethyl-20-oxo-2'-phenyl-4,6-pregnadieno-[3,2-c]pyrazole, respectively.
Each of the above compounds is converted into the 21-carboxylic acylate and the 21-phosphates, following the procedures described in Example 2.

EXAMPLE 7

17α,21 - Dihydroxy - 2' - p - fluorophenyl - 20 - oxo-4-pregneno - [3,2-c]pyrazole is prepared from the known 17α,21 - dihydroxy - 20 - oxo - 4 - pregneno - 3 - one following the procedures outlined in Example 4. The latter compounds is converted into the 21 - hydroxy - 2'-p - fluorophenyl - 20 - oxo - 4 - pregneno - [3,2-c]pyrazole following the procedures outlined in Example 1, and the 21-carboxylic acylates and the 21-phosphates of the 21 - hydroxy - 2' - p - fluorophenyl - 20 - oxo - 4 - pregneno-[3,2-c]pyrazole are obtained by the procedures of Example 2.

EXAMPLE 8

17α,21 - Dihydroxy - 6α,16α - dimethyl - 20 - oxo - 2'-p - fluoro - phenyl - 4 - pregneno - [3,2-c]pyrazole is prepared from 17α,21 - dihydroxy - 6α,16α - dimethyl-20 - oxo - 4 - pregnene - 3 - one, following the procedures outlined in Example 4. (The latter compound is prepared from the known 17α,21 - dihydroxy - 20 - oxo-4-pregnene by well-known procedures capable of general application.) The 17α,21 - dihydroxy - 6α,16α - dimethyl-20 - oxo - 2' - p - fluorophenyl - 4 - pregnene - [3,2-c] pyrazole is converted into the 21 - hydroxy - 2' - p - fluorophenyl - 20 - oxo - 4 - pregneno - [3,2-c]pyrazole following the procedures of Example 1, and the 21-carboxylic acylates and the 21phosphates of the latter compound are obtained by the procedures of Example 2.

EXAMPLE 9

17α,21 - Dihydroxy-6,16α-dimethyl-20-oxo-2'-p-fluorophenyl-4,6-pregnadieno-[3,2-c]pyrazole is prepared from 17α,21-dihydroxy-6,16α-dimethyl - 20 - oxo-4,6-pregnadiene-3-one following the procedures outlined in Example 4 (the latter compound being prepared from the known 17α,21-dihydroxy - 20 - oxo-4-pregnene by well-known procedures capable of general application).

The 17α,21-dihydroxy-6,16α-dimethyl - 20 - oxo-2'-p-fluoro-phenyl - 4,6 - pregnadieno-[3,2-c]pyrazole is converted into the 21-hydroxy-6,16α-dimethyl-20-oxo-2'-p-fluoro - phenyl-4,6-pregnadieno-[3,2-c]pyrazole following the procedures of Example 1, and the 21-carboxylic acylates and the 21-phosphates of the latter compounds are obtained by the procedures of Example 2.

EXAMPLE 10

6α-Fluoro-11β,17α,21 - trihydroxy - 16α - methyl - 20-oxo-2'-(p-fluorophenyl)-4-pregneno-[3,2-c]pyrazole (11.0 gms.) is suspended in a solution of dry methanolic hydrogen chloride (400 ml., 0.52 N). After 10 minutes of agitation the material dissolves completely to give a solution which is kept at 25° C. for 48 hours. Sodium acetate (22 gms.) in water (60 ml.) is added and the solvent is removed under vacuum to a volume of 75 ml. Water (100 ml.) is added and the mixture is extracted several times with chloroform. The chloroform extract is washed with dilute aqueous sodium carbonate and saturated salt solution and then dried over sodium sulfate. The solution is evaporated to give a solid residue which is recrystallized from a solvent to give 6α-fluoro-11β-hydroxy-16α-methyl - 20 - oxo-2'-(p-fluorophenyl)-4-pregneno-[3,2-c]pyrazole-21-al dimethyl acetal.

The above product (5.5 gms.) is added to a stirred suspension of sodium borohydride (5 gms.) in aqueous tetrahydrofuran (250 ml.). The mixture is allowed to stir at room temperature overnight. It is then poured into aqueous sodium dihydrogen phosphate solution and the mixture extracted with chloroform. The organic phase is washed with water and evaporated to dryness under vacuum. Crystallization of the residue affords 6α-fluoro-11β,20 - dihydroxy - 16α - methyl-2'-(p-fluorophenyl)-4-pregneno-[3,2-c]pyrazole-21-al dimethyl acetal.

6α-Fluoro-11β,20-dihydroxy-16α-methyl-2'-(p - fluorophenyl)-4-pregneno-[3,2-c]pyrazole-21-al dimethyl acetal (1.0 g.) in 50% aqueous acetic acid (20 ml.) is kept at 90 to 95° C. for 3 hours. The mixture is cooled to 20° C., water is added and the mixture is extracted with chloroform. The chloroform extract is washed first with aqueous sodium bicarbonate and then with water. The extract is then dried over sodium sulfate. The solvent is removed by evaporation under vacuum and the residue is recrystallized to give 6α-fluoro - 11β,20 - dihydroxy-16α-methyl-2'-(p-fluorophenyl)-4 - pregneno-[3,2-c]pyrazole-21-al.

To 6α-fluoro-11β,20-dihydroxy-16α-methyl-2'-(p - fluorophenyl)-4-pregneno-[3,2-c]pyrazole-21-al (0.6 gms.) in methanol (40 ml.) is added sodium bisulfite (250 mg.) in water (15 ml.). The slightly turbid mixture is kept at 25° C. for 1 hour, and then concentrated under vacuum at 20–30° C. until a granular precipitate appears. Water (50 ml.) is added and the concentration continued until the methanol has been removed completely. The precipitate is filtered, washed with water and dried. The colorless filtrate and washings are concentrated under vacuum to dryness. The water-soluble amorphous precipitate is triturated with absolute ethanol, and the unreacted sodium bisulfite is removed by filtration. The precipitate is the 6α-fluoro-11β,20-dihydroxy-16α-methyl-2'-(p - fluorophenyl)-4-pregneno-[3,2-c]pyrazole - 21 - al sodium bisulfite addition product.

To 6α-fluoro-11β,20-dihydroxy-16α-methyl-2'-(p - fluorophenyl)-4-pregneno-[3,2-c]pyrazole - 21 - al sodium bisulfite addition product (80 mg.) in methanol (5.0 ml.) is added freshly prepared methanolic sodium methoxide (10 ml., 0.5 N) under nitrogen. The solution is stirred at 22° C. for 30 minutes. Addition of acetic acid (0.5 ml.) neutralizes the alkali and discharges the color. Most of the solvent is removed under vacuum, water is added, and the mixture is extracted with chloroform. The chloroform extract is washed first with dilute aqueous sodium bicarbonate and then with water. The extract is then dried over sodium sulfate. Evaporation of the solvent gives a residue which is crystallized to afford 6α-fluoro-11β,21-dihydroxy-16α-methyl - 20 - oxo-2'-(p'-fluorophenyl)-4-pregneno-[3,2-c]pyrazole.

EXAMPLE 11

The 6α-fluoro-11β,21-dihydroxy-16α-methyl-20-oxo-2'-(p-fluorophenyl)-4-pregneno-[3,2-c]pyrazole (100 mg.) is dissolved in 1.2 cc. of dimethylformamide. The solution is cooled to 0° C. and 0.07 cc. of methane sulfonyl chloride is added. The mixture is kept at 0° C. for about one hour, 3 cc. of water are added and the product is extracted into 100 cc. of chloroform, washed with water, dried over sodium sulfate and taken to dryness to afford the 6α-fluoro-11β,21-dihydroxy-16α-methyl-20-oxo-2'-(p-fluorophenyl)-4-pregneno-[3,2-c]pyrazole 21-mesylate.

To a solution of 62 mg. of the above product in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness to afford 6α,21-difluoro-11β-hydroxy - 16α - methyl - 20 - oxo-2'-(p-fluorophenyl)-4-pregneno-[3,2-c]pyrazole.

A mixture of 6α-fluoro-11β,21-dihydroxy-16α-methyl-20-oxo-2'-(p-fluorophenyl) - 4 - pregneno-[3,2-c]pyrazole 21-mesylate (0.75 g.), lithium chloride (202 mg.) and dimethylformamide (30 ml.) are heated under reflux for 50 minutes, concentrated under vacuum to a small volume, and treated with water. The solid so formed is separated by filtration and recrystallized to afford the 6α-fluoro-21-chloro-11β,21-dihydroxy - 16α - methyl-20-oxo-2'-(p-fluorophenyl)-4-pregneno-[3,2-c]pyrazole.

The 6α-fluoro-11β,21-dihydroxy-16α-methyl - 20 - oxo-2'-(p - fluorophenyl)-4-pregneno-[3,2-c]pyrazole 21-mesylate is suspended in 5.5 cc. of acetone and 117 mg. of sodium iodide is added. The mixture is refluxed under nitrogen for about one hour. It is then cooled on ice. On the addition of water there is formed a white precipitate which is filtered off, washed with water, and dried under vacuum to give the 6α-fluoro-11β-hydroxy-21-iodo-16α-methyl - 20 - oxo-2'-(p-fluorophenyl)-4-pregneno-[3,2-c]pyrazole.

The above material is dissolved in 5 cc. of ethanol. Five hundred mg. of sodium bisulfite in 5 cc. of water is added, and the mixture is refluxed for one hour under nitrogen. Ten cc. of water is then added and the product is extracted into 100 cc. of chloroform, washed with water, dried over sodium sulfate and taken to dryness, to give a residue which is purified by chromatography on silica gel. The 6α-fluoro-11β-hydroxy-16α-methyl-20-oxo-2'-(p-fluoro-phenyl)-4-pregneno-[3,2-c]pyrazole so obtained is crystallized from acetone-ether.

Silver dihydrogen phosphate is prepared by the reaction of 32 g. of trisilver phosphate with 10 ml. of 100% phosphoric acid with thorough mixing in a one-liter 3-necked round-bottom flask. The silver dihydrogen phosphate is washed with two portions of diethyl ether, which are removed by decantation, to remove some of the phosphoric acid. About 200 ml. of acetonitrile are added to cover the silver dihydrogen phosphate, and the mixture is heated to reflux temperature. At this point 20 g. of 6α-fluoro-11β-hydroxy-21-iodo-16α-methyl-20-oxo - 2'-(p-fluorophenyl)-4-pregneno-[3,2-c]pyrazole is added and the mixture is refluxed in a nitrogen atmosphere with stirring for 75 minutes. The reaction mixture is then cooled over a period of about one hour to room temperature. Then 200 g. of ice water are added, and the acetonitrile is removed under vacuum at a temperature below 25° C. The pH of the resulting aqueous suspension is adjusted to 6.4 by the addition of 23 ml. of saturated aqueous sodium carbonate solution. A precipitate is formed and separated by filtration. The precipitate is washed with water until no ultraviolet absorbing material is detected in the wash water. The filtrate and wash water are combined and freeze-dried to separate a solid material from the water. The solid material is triturated with a total of 770 ml. of methanol in seven portions. The methanol-insoluble material is separated by filtration. The filtrate is then concentrated under vacuum to 200 ml. and passed through a column containing 60 g. of a cation exchange resin ("IR–120") in its hydrogen form. The column is washed with methanol until the washings contain no ultraviolet absorbing material. The combined eluate and washings are concentrated to a volume of 15 ml., and 150 ml. of ether are added. The precipitate which forms is recovered by filtration, washed with ether and dried for about 16 hours in a desiccator, to give 6α-fluoro-11β-hydroxy - 16α-methyl-20-oxo-2'-(p-fluorophenyl - 4-pregneno-[3,2-c]pyrazole 21-dihydrogen phosphate.

The mono- and the dialkali metal salts of the 21-dihydrogen phosphate compound are obtained by neutralizing the 21-dihydrogen phosphate ester with an alkali metal methoxide.

To a solution of 100 mg. of 6α-fluoro-11β,21-dihydroxy-16α-methyl-20-oxo-2'-(p-fluorophenyl) - 4-pregneno - [3, 2-c]-pyrazole in 2 ml. of pyridine is added 0.5 ml. of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The 6α-fluoro - 11β-21-dihydroxy-16α-methyl-20-oxo-2'-(p-fluoro-phenyl) - 4 - pregneno-[3,2-c] pyrazole 21-acetate is isolated by the addition of water and filtration.

In accordance with the above procedure, but using another hydrocarbon carboxylic acid acylating agent such as benzoic anhydride, or tertiary butyl acetyl chloride; a lower alkanoyl anhydride or halide such as propionic anhydride or acetyl chloride; or a polybasic anhydride such as β,β-dimethylglutaric anhydride, succinic anhydride or the like, the corresponding 21-carboxylic acid anhydride is obtained.

EXAMPLE 12

6α - Fluoro - 11β,17α,21 - trihydroxy-16α-methyl-20-oxo-4-pregneno-[3,2-c]pyrazole (11.0 gms.) is suspended in a solution of dry methanolic hydrogen chloride (400 ml., 0.52 N). After 10 minutes of agitation the material dissolves completely to give a solution which is kept at 25° C. for 48 hours. Sodium acetate (22 gms.) in water (60 ml.) is added and the solvent is removed under vacuum to a volume of 75 ml. Water (100 ml.) is added and the mixture is extracted several times with chloroform. The chloroform extract is washed with dilute aqueous sodium carbonate and saturated salt solution and then dried over sodium sulfate. The solution is evaporated to give a solid residue which is recrystallized from a solvent to give 6α-fluoro - 11β - hydroxy-16-methyl-20-oxo-4-pregneno-[3,2-c]pyrazole-21-al dimehyl acetal.

The above product (5.5 gms.) is added to a stirred suspension of sodium borohydride (5 gms.) in aqueous tetrahydrofuran (250 ml.). The mixture is allowed to stir at room temperature overnight. It is then poured into aqueous sodium dihydrogen phosphate solution and the mixture extracted with chloroform. The organic phase is washed with water and evaporated to dryness under vacuum. Crystallization of the residue affords 6α-fluoro-11β, 20-dihydroxy - 16α - methyl-4-pregneno-[3,2-c]pyrazole-21-al dimethyl acetal.

6α - Fluoro - 11β,20 - dihydroxy-16α-methyl-4-pregneno-[3,2-c]pyrazole-21-al dimethyl acetal (1.0 g.) in 50% aqueous acetic acid (20 ml.) is kept at 90 to 95° C. for 3 hours. The mixture is cooled to 20° C., water is added, and the mixture is extracted with chloroform. The chloroform extract is washed first with aqueous sodium bicarbonate, and then with water. The extract is then dried over sodium sulfate. The solvent is removed by evaporation under vacuum, and the residue is recrystallized to give 6α-fluoro-11β,20 - dihydroxy - 16α - methyl-4-pregneno-[3,2-c]pyrazole-21-al.

To 6α-fluoro-11β,20-dihydroxy - 16α - methyl-4-pregneno-[3,2-c]pyrazole-21-al (0.6 gms.) in methanol (40 ml.) is added sodium bisulfite (250 mg.) in water (15 ml.). The slightly turbid mixture is kept at 25° C. for one hour, and then concentrated under vacuum at 20–30° C. until a granular precipitate appears. Water (50 ml.) is added and the concentration continued until the methanol has been removed completely. The precipitate is filtered, washed with water and dried. The colorless filtrate and washings are concentrated under vacuum to dryness. The water-soluble amorphous precipitate is triturated with absolute ethanol, and the unreacted sodium bisulfite is removed by filtration. The precipitate is the 6α-fluoro-11β,20 - dihydroxy - 16α - methyl-4-pregneno-[3,2-c]pyrazole-21-al sodium bisulfite addition product.

To 6α-fluoro-11β,20-dihydroxy-16α-methyl-4-pregneno-[3,2-c]pyrazole-21-al sodium bisulfite addition product (80 mg.) in methanol (5.0 ml.) is added freshly prepared methanolic sodium methoxide (10 ml., 0.5 N) under nitrogen. The solution is stirred at 22° C. for 30 minutes. Addition of acetic acid (0.5 ml.) neutralizes the alkali and discharges the color. Most of the solvent is removed under vacuum, water is added and the mixture is extracted with chloroform. The chloroform extract is washed first with dilute aqueous sodium bicarbonate and then with water. The extract is then dried over sodium sulfate. Evaporation of the solvent gives a residue which is crystallized to afford 6α-fluoro-11β,21-dihydroxy-16α-methyl-20-oxo-4-pregneno-[3,2-c]pyrazole.

EXAMPLE 13

To a solution of 100 mg. of 6α-fluoro-11β,21-dihydroxy-16α-methyl-20-oxo-4-pregneno-[3,2-c]pyrazole in 2 ml. of pyridine is added two milliequivalents of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The N-acetyl-6α-fluoro - 11β,21 - dihydroxy-16α-methyl-20-oxo-4-pregneno-[3,2 - c]pyrazole 21-acetate is then isolated by addition of water and filtration.

In accordance with the above procedure, but using another hydrocarbon carboxylic acid acylating agent such as benzoic anhydride, tertiary butyl acetyl chloride, a lower alkanoyl anhydride or halide such as propionic anhydride or acetyl chloride, or a polybasic anhydride such as β,β-dimethylglutaric anhydride, succinic anhydride or the like, the corresponding 21-carboxylic acid anhydride is obtained.

A solution of 5.73 g. of N-acetyl-6α-fluoro-11β,21-dihydroxy-16α-methyl-20-oxo-4-pregneno-[3,2-c]pyrazole 21-acetate in 60 ml. of 80% (v./v) acetic acid is refluxed for 1.5 hours. This solution is diluted with 400 ml. of ice-water and extracted with ethyl acetate. The ethyl acetate extract is washed with water and with saturated sodium bicarbonate solution, dried, and evaporated to dryness under vacuum. Recrystallization of the resulting product affords 6α - fluoro-11β,21-dihydroxy-16α-methyl-20-oxo-4-pregneno-[3,2-c]pyrazole 21-acetate.

To a solution of 3.70 g. of the above product in 150 ml. of methanol there is added 30 ml. of water containing 0.01 mole of hydrogen chloride. Then a solution of 0.81 g. of potassium cyanate in 8 ml. of water is added and this mixture is left overnight at room temperature. Some of the methanol is removed under vacuum on the rotating evaporator; more water is added and the precipitate is collected by filtration. Recrystallization from methanol gives the N-carbamyl-pyrazole in sufficient purity for the next step.

A 500 mg. aliquot of the N-carbamyl-6α-fluoro-11β,21-dihydroxy - 16α - methyl-20-oxo-4-pregneno-[3,2-c]pyrazole 21-acetate is dissolved in 2.4 ml. of pure methanol and allowed to react with 0.5 ml. of a 1.33 N solution of sodium methoxide in methanol at room temperature under nitrogen atmosphere for ten minutes. The alkoxide is neutralized with acetic acid and the mixture is then taken to dryness and flushed with n-hexane. The residue is washed with water, filtered and dried to constant weight to give N-carbamyl - 6α - fluoro-11β,21-dihydroxy-16α-methyl-20-oxo-4-pregneno-[3,2-c]pyrazole.

To a solution of 85 mg. of the above product in 0.5 ml. of pyridine, cooled to 0° C., is added 0.015 ml. of methane sulfonyl chloride. The resulting mixture is allowed to stand at a temperature of approximately 0° C. for a period of approximately one hour. Water is then added to the reaction mixture and the precipitate which forms is recovered by filtration, washed with water, and dried to give N-carbamyl-6α-fluoro-11β,21-dihydroxy-16α-methyl-20-oxo-4-pregneno-[3,2-c]pyrazole 21-mesylate.

A mixture of N-carbamyl-6α-fluoro-11β,21-dihydroxy-16α - methyl-20-oxo-4-pregneno-[3,2-c]pyrazole 21-mesylate (0.75 g.), lithium chloride (202 mg.) and dimethylformamide (30 ml.) are heated under reflux for 50 minutes, concentrated under vacuum to a small volume, and treated with water. The solid so formed is separated by filtration and recrystallized to afford the N-carbamyl-6α-fluoro - 21-chloro-11β-hydroxy-16α-methyl-20-oxo-4-pregneno-[3,2-c]pyrazole.

To a solution of 62 mg. of N-carbamyl-6α-fluoro-11β,21-dihydroxy-16α-methyl-20-oxo-4-pregneno-[3,2-c]pyrazole 21 mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness to afford the N-carbamyl-6α,21-difluoro-11β-hydroxy-16α-methyl-20-oxo-4-pregneno-[3,2-c]pyrazole.

To 180 mg. of N-carbamyl-6α-fluoro-11β,21-dihydroxy-16α - methyl-20-oxo-4-pregneno-[3,2-c]pyrazole 21-meylate dissolved in 10 ml. of acetone is added 300 mg. of sodium iodide. The resulting mixture is heated at reflux temperature for a period of approximatly 1 hour, and the reaction solution is cooled to room temperature and diluted with water. The material which precipitates is recovered by filtration, washed with water, and dried to give N-carbamyl - 6α-fluoro-11β-hydroxy-16α-methyl-21-iodo-20-oxo-4-pregneno-[3,2-c]pyrazole.

The N-carbamyl-6α-fluoro-11β-hydroxy-16α-methyl-21-iodo-20-oxo-4-pregneno-[3,2-c]pyrazole (200 mg.) is dissolved in a mixture of 5 ml. of water and 5 ml. of ethanol. To the resulting suspension is added 500 mg. of sodium bisulfite, and the mixture is heated under reflux for a period of 1 hour. The reaction solution is cooled, diluted with water, and the material which separates is recovered by filtration. The product is washed with water, dried and recrystallized from ethyl acetate to give N-carbamyl-6α-fluoro - 11β-hydroxy-16α-methyl-20-oxo-4-pregneno-[3,2-c]pyrazole.

Silver dihydrogen phosphate is prepared by the reaction of 32 g. of trisilver phosphate with 10 ml. of 100% phosphoric acid with thorough mixing in a one-liter 3-necked round-bottomed flask. The silver dihydrogen phosphate is washed with two portions of diethyl ether, which are removed by decantation, to remove some of the phosphoric acid. About 200 ml. of acetonitrile are added to cover the silver dihydrogen phosphate, and the mixture is heated to reflux temperature. At this point 20 g. of N-carbamyl-6α-fluoro - 11β - hydroxy-16α-methyl-21-iodo-20-oxo-4-pregneno-[3,2-c]-pyrazole is added and the mixture is refluxed in a nitrogen atmosphere with stirring for 75 minutes. The reaction mixture is then cooled over a period of about one hour to room temperature. Then 200 g. of ice water are added, and the acetonitrile is removed under vacuum at a temperature below 25° C. The pH of the resulting aqueous suspension is adjusted to 6.4 by the addition of 23 ml. of saturated aqueous sodium carbonate solution. A precipitate is formed and separated by filtration. The precipitate is washed with water until no ultraviolet absorbing material is detected in the wash water. The filtrate and wash water area combined and freeze dried to separate a solid material from the water. The solid material is triturated with a total of 770 ml. of methanol in seven portions. The methanol-insoluble material is separated by filtration. The filtrate is then concentrated under vacuum to 200 ml. and passed through a column containing 60 g. of cation exchange resin ("IR–120") in its hydrogen form. The column is washed with methanol until the washings contain no ultraviolet absorbing material. The combined eluate and washings are concentrated to a volume of 15 ml., and 150 ml. of ether are added. The precipitate which forms is recovered by filtration, washed with ether, and dried for about 16 hours in a desiccator, to give N-carbamyl-6α-fluoro-11β-hydroxy - 16α - methyl-20-oxo-4-pregneno-[3,2-c]pyrazole 21-dihydrogen phosphate.

The mono- and the dialkali metal salts of the 21-dihydrogen phosphate compound are obtained by neutralizing the 21-dihydrogen phosphate ester with an alkali metal methoxide.

To a solution of 355 mg. of N-carbamyl-6α-fluoro-11β-hydroxy - 16α-methyl-20-oxo-4-pregneno-[3,2-c]pyrazole in 35 ml. of glacial acetic acid there is added slowly with stirring 104 mg. of sodium nitrite in 5 ml. of water. After fifteen minutes at room temperature, most of the acetic acid is removed at room temperature on the rotating evaporator. Ethyl acetate is added and this solution is extracted several times with sodium bicarbonate and then dried. Removal of the solvent, followed by chromatography on alumina, affords 6α - fluoro-11β-hydroxy-16α-methyl-20-oxo-4-pregneno-[3,2-c]pyrazole.

In accordance with the above procedure, but starting with the N-carbamyl-6α,21-difluoro-(or 6α-fluoro-21-chloro) - 11β-hydroxy-16α-methyl-20-oxo-4-pregneno-[3,2-c] pyrazole there is obtained the 6α,21-difluoro-(or 6α-fluoro-21-chloro) - 11β - hydroxy - 16α - methyl-20-oxo-4-pregneno-[3,2-c]pyrazole.

EXAMPLE 14

6 - Methyl-11β,17α,21-trihydroxy-16α-methyl-20-oxo-4,6-pregnadieno-[3,2-c]pyrazole (11.0 gms.) is suspended in a solution of dry methanolic hydrogen chloride (400 ml., 0.52 N). After 10 minutes of agitation the material dissolves completely to give a solution which is kept at 25° C. for 48 hours. Sodium acetate (22 gms.) in water (60 ml.) is added and the solvent is removed under vacuum to a volume of 75 ml. Water (100 ml.) is added and the mixture is extracted several times with chloroform. The chloroform extract is washed with dilute aqueous sodium carbonate and saturated salt solution and then dried over sodium sulfate. The solution is evaporated to give a solid residue which is recrystallized from a solvent to give 6 - methyl - 11β-hydroxy-16α-methyl-20-oxo-4,6-pregnadieno-[3,2-c]pyrazole-21-al dimethyl acetal.

The above product (5.5 gms.) is added to a stirred suspension of sodium borohydride (5 gms.) in aqueous tetrahydrofuran (250 ml.) The mixture is allowed to stir at room temperature overnight. It is then poured into aqueous sodium dihydrogen phosphate solution and the mixture extracted with chloroform. The organic phase is washed with water and evaporated to dryness under vacuum. Crystallization of the residue affords 6-methyl-11β,20-dihydroxy - 16α-methyl-4,6-pregnadieno-[3,2-c]pyrazole-21-al dimethyl acetal.

6 - Methyl-11β,20-dihydroxy-16α-methyl-4,6-pregnadieno-[3,2-c]pyrazole-21-al dimethyl acetal (1.0 g.) in 50% aqueous acetic acid (20 ml.) is kept at 90 to 95° C. for 3 hours. The mixture is cooled to 20° C., water is added and the mixture is extracted with chloroform. The chloroform extract is washed first with aqueous sodium bicarbonate, and then with water. The extract is then dried over sodium sulfate. The solvent is removed by evaporation under vacuum and the residue is recrystallized to give 6-methyl-11β,20-dihydroxy-16α-methyl-4,6-pregnadieno-[3,2-c]pyrazole-21-al.

To 6 - methyl-11β,20-dihydroxy-16α-methyl-4,6-pregnadieno-[3,2-c]pyrazole-21-al (0.6 gms.) in methanol (40 ml.) is added sodium bisulfite (250 mg.) in water (15 ml.). The slightly turbid mixture is kept at 25° C. for 1 hour, and then concentrated under vacuum at 20–30° C. until a granular precipitate appears. Water (50 ml.) is added and the concentration continued until the methanol has been removed completely. The precipitate is filtered, washed with water and dried. The colorless filtrate and washings are concentrated under vacuum to dryness. The water-soluble amorphous precipitate is triturated with absolute ethanol, and the unreacted sodium bisulfite is removed by filtration. The precipitate is the 6-methyl-11β, 20 - dihydroxy - 16α-methyl-4,6-pregnadieno-[3,2-c]pyrazole-21-al sodium bisulfite addition product.

To 6 - methyl-11β,20-dihydroxy-16α-methyl-4,6-pregnadieno-[3,2-c]pyrazole-21-al sodium bisulfite addition product (80 mg.) in methanol (5.0 ml.) is added freshly prepared methanolic sodium methoxide (10 ml., 0.5 N) under nitrogen. The solution is stirred at 22° C. for 30 minutes. Addition of acetic acid (0.5 ml.) neutralizes the alkali and discharges the color. Most of the solvent is removed under vacuum, water is added and the mixture is extracted with chloroform. The chloroform extract is washed first with dilute aqueous sodium bicarbonate and then with water. The extract is then dried over sodium sulfate. Evaporation of the solvent gives a residue which is crystallized to afford 6-methyl-11β,21-dihydroxy-16α-methyl-20-oxo-4,6-pregnadieno-[3,2-c]pyrazole.

EXAMPLE 15

To a solution of 100 mg. of 6-methyl-11β,21-dihydroxy-16α-methyl-20-oxo-4,6-pregnadieno-[3,2-c]pyrazole in 2 ml. of pyridine is added two milliequivalents of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The N-acetyl - 6-methyl-11β,21-dihydroxy-16α-methyl-20-oxo-4,6-pregnadieno-[3,2-c]pyrazole 21-acetate is then isolated by addition of water and filtration.

In accordance with the above procedure, but using another hydrocarbon carboxylic acid acylating agent such as benzoic anhydride, tertiary butyl acetyl chloride, a lower alkanoyl anhydride or halide such as propionic anhydride or acetyl chloride, or a polybasic anhydride such as β,β-dimethylglutaric anhydride, succinic anhydride or the like, the corresponding 21-carboxylic acid anhydride is obtained.

A solution of 5.73 g. of N-acetyl-6-methyl-11β,21-dihydroxy-16α-methyl - 20 - oxo - 4,6 - pregnadieno-[3,2-c]pyrazole 21-acetate in 60 ml. of 80% (v./v.) acetic acid is refluxed for 1.5 hours. This solution is diluted with 400 ml. of ice-water and extracted with ethyl acetate. The ethyl acetate extract is washed with water and with saturated sodium bicarbonate solution, dried, and evaporated to dryness under vacuum. Recrystallization of the resulting product affords 6-methyl-11β,21-dihydroxy-16α-methyl-20-oxo-4,6-pregnadieno-[3,2-c]pyrazole 21-acetate.

To a solution of 3.70 g. of the above product in 150 ml. of methanol there is added 30 ml. of water containing 0.01 mole of hydrogen chloride. Then a solution of 0.81 g. of potassium cyanate in 8 ml. of water is added and this mixture is left overnight at room temperature. Some of the methanol is removed under vacuum on the rotating evaporator; more water is added and the precipitate is collected by filtration. Recrystallization from methanol gives the N-carbamyl-pyrazole in sufficient purity for the next step.

A 500 mg. aliquot of the N-carbamyl-6-methyl-11β,21-dihydroxy-16α-methyl-20-oxo - 4,6 - pregnadieno-[3,2-c] pyrazole 21-acetate is dissolved in 2.4 ml. of pure methanol and allowed to react with 0.5 ml. of a 1.33 N solution of sodium methoxide in methanol at room temperature under nitrogen atmosphere for ten minutes. The alkoxide is neutralized with acetic acid and the mixture is then taken to dryness and flushed with n-hexane. The residue is washed with water, filtered and dried to constant weight to give N - carbamyl-6-methyl-11β,21-dihydroxy-16α-methyl-20-oxo-4,6-pregnadieno-[3,2-c]pyrazole.

To a solution of 85 mg. of the above product in 0.5 ml. of pyridine, cooled to 0° C., is added 0.015 ml. of methane sulfonyl chloride. The resulting mixture is allowed to stand at a temperature of approximately 0° C. for a period of approximately one hour. Water is then added to the reaction mixture and the precipitate which forms is recovered by filtration, washed with water, and dried to give N-carbamyl-6-methyl-11β,21-dihydroxy-16α-methyl-20-oxo-4,6-pregnadieno-[3,2-c]pyrazole 21-mesylate.

A mixture of N-carbamyl-6-methyl-11β,21-dihydroxy-16α - methyl-20-oxo-4,6-pregnadieno-[3,2-c]pyrazole 21-mesylate (0.75 g.), lithium chloride (202 mg.) and dimethylformamide (30 ml.) are heated under reflux for 50 minutes, concentrated under vacuum to a small volume, and treated with water. The solid so formed is separated by filtration and recrystallized to afford the N-carbamyl-6-methyl - 21 - chloro-11β-hydroxy-16α-methyl-20-oxo-4,6-pregnadieno-[3,2-c]pyrazole.

To a solution of 62 mg. of N-carbamyl-6-methyl-11β, 21 - dihydroxy-16α-methyl-20-oxo-4,6-pregnadieno-[3,2-c] pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into choroform, dried over sodium sufate and evaporated to dryness to afford the N-carbamyl-6-methyl-21-fluoro-11β-hydroxy-16α-methyl - 20 - oxo-4,6-pregnadieno-[3,2-c] pyrazole.

To 180 mg. of N-carbamyl-6-methyl-11β,21-dihydroxy-16α - methyl-20-oxo-4,6-pregnadieno-[3,2-c]pyrazole 21-mesylate dissolved in 10 ml. of acetone is added 300 mg. of sodiim iodide. The resulting mixture is heated at reflux temperature for a period of approximately 1 hour, and the reaction solution is cooled to room temperature and diluted with water. The material which precipitates is recovered by filtration, washed with water, and dried to give N - carbamyl-6-methyl-11β-hydroxy-16α-methyl-21-iodo-20-oxo-4,6-pregnadieno-[3,2-c]pyrazole.

The N - carbamyl-6-methyl-11β-hydroxy-16α-methyl-21-iodo-20-oxo - 4,6 - pregnadieno-[3,2-c]pyrazole (200 mg.) is dissolved in a mixture of 5 ml. of water and 5 ml. of ethanol. To the resulting suspension is added 500 mg. of sodium bisulfite, and the mixture is heated under reflux for a period of 1 hour. The reaction solution is cooled, diluted with water, and the material which separates is recovered by filtration. The product is washed with water, dried and recrystallized from ethyl acetate to give N- carbamyl - 6 - methyl-11β-hydroxy-16α-methyl-20-oxo-4,6-pregnadieno-[3,2-d]pyrazole.

Silver dihydrogen phosphate is prepared by the reaction of 32 g. of trisilver phosphate with 10 ml. of 100% phosphoric acid with thorough mixing in a one-liter 3-necked round-bottomed flask. The silver dihydrogen phosphate is washed with two portions of diethyl ether, which are removed by decantation, to remove some of the phosphoric acid. About 200 ml. of acetonitrile are added to cover the silver dihydrogen phosphate, and the mixture is heated to reflux temperature. At this point 20 g. of N-carbamyl-6-methyl-11β-hydroxy - 16α - methyl-21-iodo-20-oxo-4,6-pregnadieno-[3,2-c]pyrazole is added and the mixture is refluxed in a nitrogen atmosphere with stirring for 75 minutes. The reaction mixture is then cooled over a period of about one hour to room temperature. Then 200 g. of ice water are added, and the acetonitrile is removed under vacuum at a temperature below 25° C. The pH of the resulting aqueous suspension is adjusted to 6.4 by the addition of 23 ml. of saturated aqueous sodium carbonate solution. A precipitate is formed and separated by filtration. The precipitate is washed with water until no ultraviolet absorbing material is detected in the wash water. The filtrate and wash water are combined and freeze dried to separate a solid material from the water. The solid material is triturated with a total of 770 ml. of methanol in seven portions. The methanol-insoluble material is separated by filtration. The filtrate is then concentrated under vacuum to 200 ml. and passed through a column containing 60 g. of cation exchange resin ("IR–120") in its hydrogen form. The column is washed with methanol until the washings contain no ultraviolet absorbing material. The combined eluate and washings are concentrated to a volume of 15 ml., and 150 ml. of ether are added. The precipitate which forms is recovered by filtration, washed with ether, and dried for about 16 hours in a desiccator, to give N - carbamyl-6-methyl-11β-hydroxy-16α-methyl - 20 - oxo-4,6-pregnadieno-[3,2-c]pyrazole 21-hydrogen phosphate.

The mono- and the dialkali metal salts of the 21-dihydrogen phosphate compound are obtained by neutralizing the 21-dihydrogen phosphate ester with an alkali metal methoxide.

To a solution of 355 mg. of N-carbamyl-6-methyl-11β-hydroxy-16α-methyl-20-oxo-4,6-pregnadieno-[3,2 - c]pyrazole in 35 ml. of glacial acetic acid there is added slowly with stirring 104 mg. of sodium nitrite in 5 ml. of water. After fifteen minutes at room temperature, most of the acetic acid is removed at room temperature on the rotating evaporator. Ethyl acetate is added and this solution is extracted several times with sodium bicarbonate and then dried. Removal of the solvent, followed by chromatography on alumina, affords 6 - methyl-11β-hydroxy-16α-methyl-20-oxo-4,6-pregnadieno-[3,2-c]pyrazole.

In accordance with the above procedure, but starting with the N-carbamyl-6-methyl-21-fluoro-(or 6-methyl-21-chloro-)-11β-hydroxy-16α-methyl - 20 - oxo-4,6-pregnadieno-[3,2-c]pyrazole there is obtained the 6-methyl-21-fluoro-(or 6-methyl-21-chloro)-11β-hydroxy-16α-methyl-20-oxo-4,6-pregnadieno-[3,2-c]pyrazole.

EXAMPLE 16

6-Methyl - 11β, 17α, 21-trihydroxy-16α-methyl-20-oxo-2' - (p-fluorophenyl) - 4,6 - pregnadieno-[3,2-c]pyrazole (11.0 gms.) is suspended in a solution of dry methanolic hydrogen chloride 400 ml., 0.52 N). After 10 minutes of agitation the material dissolves completely to give a solution which is kept at 25° C. for 48 hours. Sodium acetate (22 gms.) in water (60 ml.) is added and the solvent is removed under vacuum to a volume of 75 ml. Water (100 ml.) is added and the mixture is extracted several times with chloroform. The chloroform extract is washed with dilute aqueous sodium carbonate and saturated salt solution and then dried over sodium sulfate. The solution is evaporated to give a solid residue which is recrystallized from a solvent to give 6-methyl-11β-hydroxy-16α-methyl-20 - oxo - 2'(p-fluorophenyl)-4,6-pregnadieno-[3,2-c]pyrazole-21-al dimethyl acetal.

The above product (5.5 gms.) is added to a stirred suspension of sodium borohydride (5 gms.) in aqueous tetrahydrofuran (250 ml.). The mixture is allowed to stir at room temperature overnight. It is then poured into aqueous sodium dihydrogen phosphate solution and the mixture extracted with chloroform. The organic phase is washed with water and evaporated to dryness under vacuum. Crystallization of the residue affords 6-methyl-11β, 20 - dihydroxy - 16α-methyl-2'-(p-fluorophenyl)-4,6-pregnadieno-[3,2-c]pyrazole-21-al dimethyl acetal.

6 - Methyl - 11β,20-dihydroxy-16α-methyl-2'-(p-fluorophenyl) - 4,6-pregnadieno-[3,2-c]pyrazole-21-al dimethyl acetal (1.0 g.) in 50% aqueous acetic acid (20 ml.) is kept at 90 to 95° C. for 3 hours. The mixture is cooled to 20° C., water is added and the mixture is extracted with chloroform. The chloroform extract is washed first with aqueous sodium bicarbonate, and then with water. The extract is then dried over sodium sulfate. The solvent is removed by evaporation under vacuum and the residue is recrystallized to give 6-methyl-11β,20-dihydroxy-16α-methyl - 2' - (p-fluorophenyl)-4,6-pregnadieno-[3,2-c]pyrazole-21-al.

To 6-methyl-11β,20-dihydroxy-16α-methyl-2'-(p-fluorophenyl)-4,6-pregnadieno-[3,2-c]pyrazole-21-al (0.6 gms.) in methanol (40 ml.) is added sodium bisulfite (250 mg.) in water (15 ml.). The slightly turbid mixture is kept at 25° C. for 1 hour, and then concentrated under vacuum at 20–30° C. until a granular precipitate appears. Water (50 ml.) is added and the concentration continued until the methanol has been removed completely. The precipitate is filtered, washed with water and dried. The colorless filtrate and washings are concentrated under vacuum to dryness. The water-soluble amorphous precipitate is triturated with absolute ethanol, and the unreacted sodium bisulfite is removed by filtration. The precipitate is the 6 - methyl-11β,20-dihydroxy-16α-methyl-2'-(p-fluorophenyl) - 4,6 - pregnadieno-[3,2-c]pyrazole-21-al sodium bisulfite addition product.

To 6-methyl-11β,20-dihydroxy-16α-methyl-2'(p-fluorophenyl)-4,6-pregnadieno-[3,2-c]pyrazole-21-al sodium bisulfite addition product (80 mg.) in methanol (5.0 ml.) is added freshly prepared methanolic sodium methoxide (10 ml., 0.5 N) under nitrogen. The solution is stirred at 22° C. for 30 minutes. Addition of acetic acid (0.5 ml.) neutralizes the alkali and discharges the color. Most of the solvent is removed under vacuum, water is added and the mixture is extracted with chloroform. The chloroform extract is washed first with dilute aqueous sodium bicarbonate and then with water. The extract is then dried over sodium sulfate. Evaporation of the solvent gives a residue which is crystallized to afford 6-methyl-11β,21-dihydroxy - 16α - methyl-20-oxo-2'-(p-fluorophenyl)-4,6-pregnadieno[3,2-c]pyrazole.

EXAMPLE 17

The 6-methyl-11β,21-dihydroxy-16α-methyl-20-oxo-2'-(p - fluorophenyl) - 4,6-pregnadieno-[3,2-c]pyrazole (100 mg.) is dissolved in 1.2 cc. of dimethylformamide. The solution is cooled to 0° C. and 0.07 cc. of methane sulfonyl chloride is added. The mixture is kept at 0° C. for about one hour, 3 cc. of water is added and the product is extracted into 100 cc. of chloroform, washed with water, dried over sodium sulfate and taken to dryness to afford the 6-methyl-11β,21-dihydroxy-16α-methyl-20-oxo-2'-(p - fluorophenyl) - 4,6 - pregnadieno-[3,2-c]pyrazole-21-mesylate.

To a solution of 62 mg. of the above product in 1 ml. of freshly distilled anhydrous dimethylformamide is added enough anhydrous potassium fluoride to assure a saturated solution. The mixture is heated at 100° C. for 20 hours. Water is added to the cooled solution and the product is extracted into chloroform, dried over sodium sulfate and evaporated to dryness to afford 6-methyl-21-fluoro - 11β - hydroxy - 16α - methyl-20-oxo-2'-(p-fluorophenyl)-4,6-pregnadieno-[3,2-c]pyrazole.

A mixture of 6-methyl-11β,21-dihydroxy-16α-methyl-20-oxo-2'-(p-fluorophenyl)-4,6-pregnadieno-[3,2 - c]pyrazole-21-mesylate (0.75 g.), lithium chloride (202 mg.) and dimethylformamide (30 ml.) are heated under reflux for 50 minutes, concentrated under vacuum to a small volume, and treated with water. The solid so formed is separated by filtration and recrystallized to afford the 6 - methyl - 21 - chloro-11β,21-dihydroxy-16α-methyl-20-oxo-2'-(p-fluorophenyl)-4,6-pregnadieno-[3,2-c]pyrazole.

The 6 - methyl - 11β,21 - dihydroxy - 16α - methyl - 20 - oxo - 2' - (p - fluorophenyl) - 4,6 - pregnadieno - [3,2-c] pyrazole-21-mesylate is suspended in 5.5 cc. of acetone and 117 mg. of sodium iodide is added. The mixture is refluxed under nitrogen for about one hour. It is then cooled on ice. On the addition of water there is formed a white precipitate which is filtered off, washed with water, and dried under vacuum to give the 6-methyl-11β-hydroxy - 21 - iodo - 16α - methyl - 20 - oxo - 2' - (p-fluorophenyl-4,6-pregnadieno-[3,2-c]pyrazole.

The above material is dissolved in 5 cc. of ethanol. Five hundred mg. of sodium bisulfate in 5 cc. of water is added, and the mixture is refluxed for one hour under nitrogen. Ten cc. of water is then added, and the product is extracted in 100 cc. of chloroform, washed with water, dried over sodium sulfate and taken to dryness, to give a residue which is purified by chromatography on silica gel. The 6-methyl - 11β - hydroxy - 16α - methyl - 20 - oxo - 2' - (p - fluorophenyl) - 4.6 - pregnadieno - [3,2-c]pyrazole so obtained is crystallized from acetone-ether.

Silver dihydrogen phosphate is prepared by the reaction of 32 g. of trisilver phosphate with 10 ml. of 100% phosphoric acid with thorough mixing in a one-liter 3-necked round-bottomed flask. The silver dihydrogen phosphate is washed with two portions of diethyl ether, which are removed by decantation, to remove some of the phosphoric acid. About 200 ml. of acetonitrile are added to cover the silver dihydrogen phosphate, and the mixture is heated to reflux temperature. At this point 20 g. of 6-methyl-11β - hydroxy - 21 - iodo - 16α-methyl-20-oxo-2'-(p-fluorophenyl)-4,6-pregnadieno-[3,2-c]-pyrazole is added and the mixture is refluxed in a nitrogen atmosphere with stirring for 75 minutes. The reaction mixture is then cooled over a period of about one hour to room temperature. Then 200 g. of ice water are added, and the acetonitrile is removed under vacuum at a temperature below 25° C. The pH of the resulting aqueous suspension is adjusted to 6.4 by the addition of 23 ml. of saturated aqueous sodium carbonate solution. A precipitate is formed and separated by filtration. The precipitate is washed with water until no ultraviolet absorbing material is detected in the wash water. The filtrate and wash water are combined and freeze-dried to separate a solid material from the water. The solid material is triturated with a total of 770 ml. of methanol in seven portions. The methanol-insoluble material is separated by filtration. The filtrate is then concentrated under vacuum to 200 ml. and passed through a column containing 60 g. of a cation exchange resin ("IR–1120") in its hydrogen form. The column is washed with methanol until the washings contain no ultraviolet absorbing material. The combined eluate and washings are concentrated to a volume of 15 ml., and 150 ml. of ether are added. The precipitate which forms is recovered by filtration, washed with ether, and dried for about 16 hours in a desiccator, to give 6-methyl-11β-hydroxy-16α-methyl - 20 - oxo - 2' - (p-fluorophenyl)-4,6-pregnadieno-[3,2-c]pyrazole-21-dihydrogen phosphate.

The mono- and the dialkali metal salts of the 21-dihydrogen phosphate compound are obtained by neutralizing the 21-dihydrogen phosphate ester with an alkali metal methoxide.

To a solution of 100 mg. of 6-methyl-11β,21-dihydroxy-16α - methyl - 20 - oxo - 2'-(p-fluorophenyl)-4,6-pregnadieno-[3,2-c]pyrazole in 2 ml. of pyridine is added 0.5 ml. of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The 6-methyl-11β,21 - dihydroxy - 16α - methyl-20-oxo-2'-(p-fluorophenyl) - 4,6 - pregnadieno-[3,2-c]pyrazole-21-acetate is isolated by the addition of water and filtration.

In accordance with the above procedure, but using another hydrocarbon carboxylic acid acylating agent such as benzoic anhydride, or teritary butyl acetyl chloride; a lower alkanoyl anhydride or halide such as propionic anhydride or acetyl chloride; or a polybasic anhydride such as β,β-dimethylglutaric anhydride, succinic anhydride or the like, the corresponding 21-carboxylic acid anhydride is obtained.

EXAMPLE 18

11β,17α,21 - Trihydroxy - 16α - methyl-20-oxo-2'-(p-fluorophenyl)-4-pregneno-[3,2-c]pyrazole (11.0 gms.) is suspended in a solution of dry methanolic hydrogen chloride (400 ml., 0.52 N). After 10 minutes of agitation the material dissolves completely to give a solution which is kept at 25° C. for 48 hours. Sodium acetate (22 gms.) in water (60 ml.) is added and the solvent is removed under vacuum to a volume of 75 ml. Water (100 ml.) is added and the mixture is extracted several times with chloroform. The chloroform extract is washed with dilute aqueous sodium carbonate and saturated salt solution and then dried over sodium sulfate. The solution is evaporated to give a solid residue which is recrystallized from a solvent to give 11β-hydroxy-16α-methyl-20-oxo-2'-(p-fluorophenyl)-4-pregneno-[3,2-c]pyrazole-21-al dimethyl acetal.

The above product (5.5 gms.) is added to a stirred suspension of sodium borohydride (5 gms.) in aqueous tetrahydrofuran (250 ml.). The mixture is allowed to stir at room temperature overnight. It is then poured into aqueous sodium dihydrogen phosphate solution and the mixture extracted with chloroform. The organic phase is washed with water and evaporated to dryness under vacuum. Crystallization of the residue affords 11β,20-dihydroxy - 16α - methyl - 2' - (p-fluorophenyl)-4-pregneno-[3,2-c]pyrazole-21-al dimethyl acetal.

11β,20 - Dihydroxy - 16α - methyl-2'-(p-fluorophenyl)-4 - pregneno - [3,2-c]pyrazole-21-al dimethyl acetal (1.0 g.) in 50% aqueous acetic acid (20 ml.) is kept at 90 to 95° C. for 3 hours. The mixture is cooled to 20° C., water is added and the mixture is extracted with chloroform. The chloroform extract is washed first with aqueous sodium bicarbonate, and then with water. The extract is then dried over sodium sulfate. The solvent is removed by evaporation under vacuum and the residue is recrystallized to give 11β,20 - dihydroxy - 16α - methyl - 2' - (p-fluorophenyl)-4-pregneno-[3,2-c]pyrazole-21-al.

To 11β,20 - dihydroxy-16α-methyl-2'-(p-fluorophenyl)-4-pregneno-[3,2-c]pyrazole-21-al (0.6 gms.) in methanol (40 ml.) is added sodium bisulfite (250 mg.) in water (15 ml.). The slightly turbid mixture is kept at 25° C. for 1 hour, and then concentrated under vacuum at 20–30° C. until a granular precipitate appears. Water (50 ml.) is added and the concentration continued until the methanol has been removed completely. The precipitate is filtered, washed with water and dried. The colorless filtrate and washings are concentrated under vacuum to dryness. The water-soluble amorphous precipitate is triturated with absolute ethanol, and the unreacted sodium bisulfite is removed by filtration. The precipitate is the 11β,20-dihydroxy - 16α - methyl - 2' - (p-fluorophenyl)-4-pregneno-[3,2-c]pyrazole-21-al sodium bisulfite addition product.

To 11β,20 - dihydroxy-16α-methyl-2'-(p-fluorophenyl)-4-pregneno-[3,2-c]pyrazole-21-al sodium bisulfite addition product (80 mg.) in methanol (5.0 ml.) is added freshly prepared methanolic sodium methoxide (10 ml., 0.5 N.) under nitrogen. The solution is stirred at 22° C. for 30 minutes. Addition of acetic acid (0.5 ml.) neutralizes the alkali and discharges the color. Most of the solvent is removed under vacuum, water is added and the mixture is extracted with chloroform. The chloroform extract is washed first with dilute aqueous sodium bicarbonate and then with water. The extract is then dried over sodium sulfate. Evaporation of the solvent gives a residue which is crystallized to afford 11β,21-dihydroxy-16α - methyl - 20 - oxo-2'-(p-fluorophenyl)-4-pregneno-[3,2-c]pyrazole.

EXAMPLE 19

The 11β,21-dihydroxy-16α-methyl-20-oxo-2'-(p-fluorophenyl)-4-pregneno-[3,2-c]pyrazole (100 mg.) is dissolved in 1.2 cc. of dimethylformamide. The solution is cooled to 0° C. and 0.07 cc. of methane sulfonyl chloride is added. The mixture is kept at 0° C. for about one hour, 3 cc. of water is added and the product is extracted into 100 cc. of chloroform, washed with water, dried over sodium sulfate and taken to dryness to afford the 11β,21-dihydroxy - 16α - methyl - 20-oxo-2'-(p-fluorophenyl)-4-pregneno-[3,2-c]pyrazole-21-mesylate.

To a solution of 62 mg. of the above product in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness to afford 21-fluoro-11β-hydroxy-16α - methyl-20-oxo-2'-(p-fluorophenyl)-4-pregneno-[3,2-c]pyrazole.

A mixture of 11β,21-dihydroxy-16α-methyl-20-oxo-2'-(p - fluorophenyl)-4-pregneno-[3,2-c]pyrazole-21-mesylate (0.75 g.), lithium chloride (202 mg.) and dimethylformamide (30 ml.) are heated under reflux for 50 minutes, concentrated under vacuum to a small volume, and treated with water. The solid so formed is separated by filtration and recrystallized to afford the 21-chloro-11β,21-dihydroxy-16α-methyl 20-oxo-2'-(p-fluorophenyl)-4-pregneno-[3,2-c]pyrazole.

The 11β,21-dihydroxy-16α-methyl-20-oxo-2'-(p-fluorophenyl)-4-pregneno-[3,2-c]pyrazole-21-mesylate is suspended in 5.5 cc. of acetone and 117 mg. of sodium iodide is added. The mixture is refluxed under nitrogen for about one hour. It is then cooled on ice. On the addition of water there is formed a white precipitate which is filtered off, washed with water, and dried under vacuum to give the 11β - hydroxy - 21-iodo-16α-methyl-20-oxo-2'-(p-fluorophenyl)-4-pregneno-[3,2-c]pyrazole.

The above material is dissolved in 5 cc. of ethanol. Five hundred mg. of sodium bisulfite in 5 cc. of water is added, and the mixture is refluxed for one hour under nitrogen. Ten cc. of water is then added and the product is extracted into 100 cc. of chloroform, washed with water, dried over sodium sulfate and taken to dryness, to give a residue which is purified by chromatography on silica gel. The 11β - hydroxy - 16α-methyl-20-oxo-2'-(p-fluorophenyl)-4-pregneno-[3,2-c]pyrazole so obtained is crystallized from acetone-ether.

Silver dihydrogen phosphate is prepared by the reaction of 32 g. of trisilver phosphate with 10 ml. of 100% phosphoric acid with thorough mixing in a one-liter 3-necked round-bottomed flask. The silver dihydrogen phosphate is washed with two portions of diethyl ether, which are removed by decantation, to remove some of the phosphoric acid. About 200 ml. of acetonitrile are added to cover the silver dihydrogen phosphate, and the mixture is heated to reflux temperature. At this point 20 g. of 11β-hydroxy - 21-iodo-16α-methyl-20-oxo-2'-(p-fluorophenyl)-4-pregneno-[3,2-c]pyrazole is added and the mixture is refluxed in a nitrogen atmosphere with stirring for 75 minutes. The reaction mixture is then cooled over a period of about one hour to room temperature. Then 200 g. of ice water are added, and the acetonitrile is removed under vacuum at a temperature below 25° C. The pH of the resulting aqueous suspension is adjusted to 6.4 by the addition of 23 ml. of saturated aqueous sodium carbonate solution. A precipitate is formed and separated by filtration. The precipitate is washed with water until no ultraviolet absorbing material is detected in the wash water. The filtrate and wash water are combined and freeze-dried to separate a solid material from the water. The solid material is triturated with a total of 770 ml. of methanol in seven portions. The methanol-insoluble material is separated by filtration. The filtrate is then concentrated under vacuum to 200 ml. and passed through a column containing 60 g. of a cation exchange resin ("IR-120") in its hydrogen form. The column is washed with methanol until the washings contain no ultraviolet absorbing material. The combined eluate and washings are concentrated to a volume of 15 ml., and 150 ml. of ether are added. The precipitate which forms is recovered by filtration, washed with ether, and dried for about 16 hours in a desiccator, to give 11β-hydroxy-16α-methyl-20-oxo-2'-(p-fluorophenyl)-4-pregneno-[3,2-c]pyrazole-21-dihydrogen phosphate.

The mono- and the dialkali metal salts of the 21-dihydrogen phosphate compound are obtained by neutralizing the 21-dihydrogen phosphate ester with an alkali metal methoxide.

To a solution of 100 mg. of 11β,21-dihydroxy-16α-methyl - 20 - oxo-2'-(p-fluorophenyl)-4-pregneno-[3,2-c]pyrazole in 2 ml. of pyridine is added 0.5 ml. of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The 11β,21-dihydroxy-16α-methyl-20-oxo-2'-(p-fluorophenyl) - 4 - pregneno-[3,2-c]pyrazole-21-acetate is isolated by the addition of water and filtration.

In accordance with the above procedure, but using another hydrocarbon carboxylic acid acylating agent such as benzoic anhydride, or tertiary butyl acetyl chloride; a lower alkanoyl anhydride or halide such as propionic anhydride or acetyl chloride; or a polybasic anhydride such as β,β-dimethylglutaric anhydride, succinic anhydride or the like, the corresponding 21-carboxylic acid anhydride is obtained.

EXAMPLE 20

11β,17α,21 - Trihydroxy - 16α - methyl-20-oxo-4-pregneno-[3,2-c]pyrazole (11.0 gms.) is suspended in a solution of dry methanolic hydrogen chloride (400 ml., 0.52 N). After 10 minutes of agitation the material dissolves completely to give a solution which is kept at 25° C. for 48 hours. Sodium acetate (22 gms.) in water (60 ml.) is added and the solvent is removed under vacuum to a volume of 75 ml. Water (100 ml.) is added and the mixture is extracted several times with chloroform. The chloroform extract is washed with dilute aqueous sodium carbonate and saturated salt solution and then dried over sodium sulfate. The solution is evaporated to give a solid residue which is recrystallized from a solvent to give 11β-hydroxy - 16α-methyl-20-oxo-4-pregneno-[3,2-c]pyrazole-21-al dimethyl acetal.

The above product (5.5 gms.) is added to a stirred suspension of sodium borohydride (5 gms.) in aqueous tetrahydrofuran (250 ml.). The mixture is allowed to stir at room temperature overnight. It is then poured into aqueous sodium dihydrogen phosphate solution and the mixture extracted with chloroform. The organic phase is washed with water and evaporated to dryness under vacuum. Crystallization of the residue affords 11β,20-dihydroxy-16α-methyl - 4 - pregneno[3,2-c]pyrazole-21-al dimethyl acetal.

11α,20 - Dihydroxy-16α-methyl - 4 - pregneno-[3,2-c]pyrazole-21-al dimethyl acetal (1.0 g.) in 50% aqueous acetic acid (20 ml.) is kept at 90 to 95° C. for 3 hours. The mixture is cooled to 20° C., water is added and the mixture is extracted with chloroform. The chloroform extract is washed first with aqueous sodium bicarbonate, and then with water. The extract is then dried over sodium sulfate. The solvent is removed by evaporation under vacuum and the residue is recrystallized to give 11β, 20-dihydroxy-16α-methyl - 4 - pregneno-[3,2-c]pyrazole-21-al.

To 11β,20-dihydroxy-16α-methyl - 4 - pregneno-[3,2-c]pyrazole-21-al (0.6 gms.) in methanol (40 ml.) is added sodium bisulfite (250 mg.) in water (15 ml.). The slightly turbid mixture is kept at 25° C. for 1 hour, and then concentrated under vacuum at 20–30° C. until a granular precipitate appears. Water (50 ml.) is added and the concentration continued until the methanol has been removed completely. The precipitate is filtered, washed with water and dried. The colorless filtrate and washings are concentrated under vacuum to dryness. The water-soluble amorphous precipitate is triturated with absolute ethanol, and the unreacted sodium bisulfite is removed by filtration. The precipitate is the 11β,20-dihydroxy-16α-methyl-4-pregneno-[3,2-c]pyrazole-21-al sodium bisulfite addition product.

To 11β,20-dihydroxy-16α-methyl - 4 - pregneno[3,2-c]pyrazole-21-al sodium bisulfite addition product (80 mg.) in methanol (5.0 ml.) is added freshly prepared methanolic sodium methoxide (10 ml., 0.5 N) under nitrogen. The solution is stirred at 22° C. for 30 minutes. Addition of acetic acid (0.5 ml.) neutralizes the alkali and discharges the color. Most of the solvent is removed under vacuum, water is added and the mixture is extracted with chloroform. The chloroform extract is washed first with dilute aqueous sodium bicarbonate and then with water. The extract is then dried over sodium sulfate. Evaporation of the solvent gives a residue which is crystallized to afford 11β,21-dihydroxy - 16α - methyl-20-oxo-4-pregneno-[3,2-c]pyrazole.

EXAMPLE 21

To a solution of 100 mg. of 11β,21-dihydroxy-16α-methyl-20-oxo-4-pregneno[3,2-c]pyrazole in 2 ml. of pyridine is added two milliequivalents of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The N-acetyl-11β,21-dihydroxy-16α-methyl-20-oxo-4-pregneno[3,2-c]pyrazole 21-acetate is then isolated by addition of water and filtration.

In accordance with the above procedure, but using another hydrocarbon carboxylic acid acylating agent such as benzoic anhydride, tertiary butyl acetyl chloride, a lower alkanoyl anhydride or halide such as propionic anhydride or acetyl chloride, or a polybasic anhydride such as β,β-dimethylglutaric anhydride, succinic anhydride or the like, the corresponding 21-carboxylic acid anhydride is obtained.

A solution of 5.73 g. of N-acetyl-11β,21-dihydroxy-16α-methyl-20-oxo-4-pregneno-[3,2 - c]pyrazole 21-acetate in 60 ml. of 80% (v./v.) acetic acid is refluxed for 1.5 hours. This solution is diluted with 400 ml. of ice-water and extracted with ethyl acetate. The ethyl acetate extract is washed with water and with saturated sodium bicarbonate solution, dried, and evaporated to dryness under vacuum. Recrystallization of the resulting product affords 11β,21-dihydroxy-16α-methyl - 20 - oxo-4-pregneno-[3,2-c]pyrazole-21-acetate.

To a solution of 3.70 g. of the above product in 150 ml. of methanol there is added 30 ml. of water containing 0.01 mole of hydrogen chloride. Then a solution of 0.81 g. of potassium cyanate in 8 ml. of water is added and this mixture is left overnight at room temperature. Some of the methanol is removed under vacuum on the rotating evaporator; more water is added and the precipitate is collected by filtration. Recrystallization from methanol gives the N-carbamyl-pyrazole in sufficient purity for the next step.

A 500 mg. aliquot of the N-carbamyl-11β,21-dihydroxy-16α-methyl-20-oxo-4-pregneno[3,2 - c]pyrazole-21-acetate is dissolved in 2.4 ml. of pure methanol and allowed to react with 0.5 ml. of a 1.33 N solution of sodium methoxide in methanol at room temperature under nitrogen atmosphere for ten minutes. The alkoxide is neutralized with acetic acid and the mixture is then taken to dryness and flushed with n-hexane. The residue is washed with water, filtered and dried to constant weight to give N-carbamyl-11β,21-dihydroxy-16α-methyl-20-oxo-4-pregneno[3,2-c]pyrazole.

To a solution of 85 mg. of the above product in 0.5 ml. of pyridine, cooled to 0° C., is added 0.015 ml. of methane sulfonyl chloride. The resulting mixture is allowed to stand at a temperature of approximately 0° C. for a period of approximately one hour. Water is then added to the reaction mixture and the precipitate which forms is recovered by filtration, washed with water, and dried to give N-carbamyl-11β,21-dihydroxy-16α-methyl-20-oxo-4-pregneno-[3,2-c]pyrazole-21-mesylate.

A mixture of N-carbamyl-11β,21-dihydroxy-16α-methyl-20-oxo-4-pregneno-[3,2 - c]pyrazole-21-mesylate (0.75 g.), lithium chloride (202 mg.) and dimethylformamide (30 ml.) are heated under reflux for 50 minutes, concentrated under vacuum to a small volume, and treated with water. The solid so formed is separated by filtration and recrystallized to afford the N-carbamyl-21-chloro-11β-hydroxy-16α-methyl-20-oxo-4-pregneno-[3,2-c]pyrazole.

To a solution of 62 mg. of N-carbamyl-11β,21-dihydroxy-16α-methyl-20-oxo - 4 - pregneno-[3,2-c]pyrazole-21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform, dried over sodium sulfate and evaporated to dryness to afford the N-carbamyl-21-fluoro-11β-hydroxy - 16α - methyl-20-oxo-4-pregneno-[3,2-c]pyrazole.

To 180 mg. of N-carbamyl-11β,21-dihydroxy-16α-methyl-20-oxo - 4 - pregneno-[3,2-c]pyrazole-21-mesylate dissolved in 10 ml. of acetone is added 300 mg. of sodium iodide. The resulting mixture is heated at reflux temperature for a period of approximately 1 hour, and the reaction solution is cooled to room temperature and diluted with water. The material which precipitates is recovered by filtration, washed with water, and dried to give N-carbamyl-11β-hydroxy-21-iodo - 16α - methyl-20-oxo-4-pregneno-[3,2-c]pyrazole.

The N-carbamyl-11β-hydroxy-21-iodo-16α-methyl-20-oxo-4-pregneno-[3,2-c]pyrazole (200 mg.) is dissolved in a mixture of 5 ml. of water and 5 ml. of ethanol. To the resulting suspension is added 500 mg. of sodium bisulfite, and the mixture is heated under reflux for a period of 1 hour. The reaction solution is cooled, diluted with water, and the material which separates is recovered by filtration. The product is washed with water, dried and recrystallized from ethyl acetate to give N-carbamyl- 11β-hydroxy-16α-methyl - 20 - oxo-4-pregneno-[3,2-c]pyrazole.

Silver dihydrogen phosphate is prepared by the reaction of 32 g. of trisilver phosphate with 10 ml. of 100% phosphoric acid with thorough mixing in a one-liter 3-necked round-bottomed flask. The silver dihydrogen phosphate is washed with two portions of diethyl ether, which are removed by decantation, to remove some of the phosphoric acid. About 200 ml. of acetonitrile are added to cover the silver dihydrogen phosphate, and the mixture is heated to reflux temperature. At this point 20 g. of N-carbamyl-11β-hydroxy-21-iodo-16α-methyl-20-oxo-4-pregneno-[3,2-c]pyrazole is added and the mixture is refluxed in a nitrogen atmosphere with stirring for 75 minutes. The reaction mixture is then cooled over a period of about one hour to room temperature. Then 200 g. of ice water are added, and the acetonitrile is removed under vacuum at a temperature below 25° C. The pH of the resulting aqueous suspension is adjusted to 6.4 by the addition of 23 ml. of saturated aqueous sodium carbonate solution. A precipitate is formed and separated by filtration. The precipitate is washed with water until no ultraviolet absorbing material is detected in the wash water. The filtrate and wash water are combined and freeze-dried to separate a solid material from the water. The solid material is triturated with a total of 770 ml. of methanol in seven portions. The methanol-insoluble material is separated by filtration. The filtrate is then concentrated under vacuum to 200 ml. and passed through a column containing 60 g. of cation exchange resin ("IR-120") in its hydrogen form. The column is washed with methanol until the washings contain no ultraviolet absorbing material. The combined eluate and washings are concentrated to a volume of 15 ml., and 150 ml. of ether are added. The precipitate which forms is recovered by filtration, washed with ether, and dried for about 16 hours in a desiccator, to give N-carbamyl-11β-hydroxy-16α-methyl-20-oxo - 4 - pregneno-[3,2-c]pyrazole-21-dihydrogen phosphate.

The mono- and the dialkali metal salts of the 21-dihydrogen phosphate compound are obtained by neutralizing the 21-dihydrogen phosphate ester with an alkali metal methoxide.

To a solution of 355 mg. of N-carbamyl-11β-hydroxy-16α-methyl-20-oxo-4-pregneno-[3,2-c]pyrazole in 35 ml. of glacial acetic acid there is added slowly with stirring 104 mg. of sodium nitrite in 5 ml. of water. After fifteen minutes at room temperature, most of the acetic acid is removed at room temperature on the rotating evaporator. Ethyl acetate is added and this solution is extracted several times with sodium bicarbonate and then dried. Removal of the solvent, followed by chromatography on alumina, affords 11β-hydroxy - 16α - methyl-20-oxo-4-pregneno-[3,2-c]pyrazole.

In accordance with the above procedure, but starting with the N-carbamyl-21-fluoro-(or 21-chloro-)-11β-hydroxy-16α-methyl-20-oxo - 4 - pregneno-[3,2-c]pyrazole there is obtained the 21-fluoro-(or 21-chloro)-11β-hydroxy-16α-methyl-20-oxo-4-pregneno-[3,2-c]pyrazole.

EXAMPLE 22

3.25 grams of 11β-hydroxy-20-oxo-4-pregneno-[3,2-c]pyrazole is dissolved in 76 ml. of dry pyridine and added to a cold solution prepared by the cautious addition of 3.25 grams of chromium trioxide to 34.7 ml. of cold pyridine. The mixture is allowed to stand at room temperature overnight and then poured into water. The solution is extracted three times with ethyl acetate and the combined ethyl acetate extracts are washed three times with $N$ sulfuric acid and then with water until neutral. The combined ethyl acetate extracts are dried over magnesium sulfate, filtered, and the solvent is removed by distillation under reduced pressure. The residue is 11,20-dioxo-4-pregneno-[3,2-c]pyrazole and is purified by chromatography on basic alumina by the use of a benzene solution. Elution is accomplished by the use of a benzene-chloroform solution.

In accordance with the above procedure, but starting with 9α - fluoro-11β-hydroxy-20-oxo-4-pregnene-[3,2-c]pyrazole, 11β-hydroxy-20-oxo-2'-phenyl-4-pregneno-[3,2-c]pyrazole, 11β - hydroxy-6α-methyl-20-oxo-2'-phenyl-4-pregneno-[3,2-c]pyrazole, 11β - hydroxy-20-oxo-2'-(p-fluorophenyl)-4-pregneno-[3,2-c]-pyrazole, 11β-hydroxy-6α,16α-dimethyl-20-oxo-2'-(p-fluorophenyl) - 4 - pregneno-[3,2-c]pyrazole, 11β - hydroxy-20-oxo-4,6-pregnadieno-[3,2-c]pyrazole, 11β - hydroxy-16-methylene-20-oxo-4,6-pregnadieno-[3,2-c]pyrazole, 9α - fluoro-11β-hydroxy-20-oxo-2'-phenyl - 4,6 - pregnadieno-[3,2-c]pyrazole, 11β-hydroxy - 20 - oxo-2'-(p-fluorophenyl)-4,6-pregnadieno-[3,2-c]-pyrazole, 11β-hydroxy-16β-methyl-20-oxo-2'-(p-fluorophenyl) - 4,6 - pregnadieno-[3,2-c]pyrazole, or 9α-fluoro-11β-hydroxy-6,16-dimethyl-20-oxo-2'-(p-fluorophenyl) - 4,6 - pregnadieno-[3,2-c]pyrazole, there are obtained the corresponding 11,20-dioxo steroids resulting from the oxidation of the 11β-hydroxy group.

EXAMPLE 23

A mixture of 10 gms. of 6α-methyl-11β-hydroxy-4-pregnene-3,20-dione, 1 g. of oxalic acid, 30 ml. of ethylene glycol and 500 ml. benzene, is heated under reflux, with vigorous stirring, for a period of about 15 hours. The water formed during the reaction is removed by benzene distillation. The reaction mixture is cooled, washed with 200 ml. of a 5% aqueous sodium bicarbonate solution, then with water until neutral, and the resulting benzene solution is dried over sodium sulfate and evaporated to dryness to give approximately 12 gms. of crude 3,20-bisdioxolane of 6α-methyl-11β-hydroxy-4-pregnene-3,20-dione, which is obtained in the form of an oil. This material is recycled by mixing it with 1 g. of oxalic acid, 30 ml. of ethylene glycol and 500 ml. of benzene, and heating the mixture under reflux, with stirring, for a period of 15 hours, again removing water formed during the reaction by benzene distillation. The resulting reaction mixture is washed with aqueous sodium bicarbonate solution, then with water, and the benzene solution is dried and evaporated; the resulting product crystallizes upon trituration with ether to give about 10 gms. of a mixture of the 3,20-bisdioxolane of 6α-methyl-11β-hydroxy-4-pregnene-3,20-dione and 3,20-bisdioxolane of 6α-methyl-11β-hydroxy-5-pregnene-3,20-dione.

About 10 gms. of the above-noted mixture of 3,20-bisdioxolanes of Δ⁴- and Δ⁵-pregnene isomers is dissolved in 1 liter of benzene saturated with water. About 100 g. of silica gel is added, and the mixture is stirred vigorously at room temperature for approximately 15 hours. About 1 liter of methanol is added, the silica gel is removed by filtration, and the filtered solution is evaporated to dryness to give approximately 9 g. of an amorphous solid. This material is chromatographed on 250 g. of silica gel using 4% methanol in chloroform as the developing solvent, followed by elution with chloroform. From the latter chloroform eluants is obtained approximately 4 g. of 20-dioxolane of 6α - methyl-11β-hydroxy-4-pregnene-3,20-dione; m.p. 135–140° C.

To a solution of about 9 g. of the 20-dioxolane of 6α-methyl-11β-hydroxy-4-pregnene-3,20-dione in 500 ml. of dry benzene is added 20 ml. of freshly-distilled ethyl formate. About 6 g. of sodium hydride (52%, dispersed in mineral oil) is added, followed by 0.5 ml. of 2.5 N methanol solution of sodium methoxide. The resulting mixture is stirred at room temperature for a period of about 3 hours during which the mixture becomes dark brown in color. Any excess sodium hydride which may be present is decomposed by the cautious addition of about 8 ml. of water. The resulting mixture is diluted with 500 ml. of ether, and extracted with three 150 ml.-portions of 1 N aqueous sodium hydroxide solution. The aqueous alkaline extracts are combined, washed with 500 ml. of a 1:1 benzene: ether mixture, and the resulting mixture is allowed to stand for a period of about one hour. The layers are separated, and the aqueous alkaline layer is neutralized by the addition of a saturated aqueous sodium dihydrogen phosphate solution. The resulting neutralized aqueous solution is extracted with three 250 ml.-portions of methylene chloride, and the methylene chloride extracts are combined, washed with water, dried over anhydrous sodium sulfate, and evaporated to dryness to give about 8.5 g. of an amorphous yellow solid; this material is dissolved in 50 ml. of hot ethanol, the ethanolic solution is cooled to about 0–5° C., and maintained at that temperature for several hours, during which time a crystalline material separates. This crystalline material is recovered by filtration, washed with a small amount of cold ethanol, and air dried to give about 5 g. of the 20-dioxolane of 2-hydroxymethylene-6α-methyl-11β-hydroxy - 4 - pregnene-3,20-dione, which is obtained in the form of pale yellow crystals; m.p. 145–148° C.

A mixture of about 2 g. of p-fluorophenylhydrazine-hydrochloride, about 1 g. of sodium acetate, and 200 ml. of ethanol is heated to reflux temperature. To this mixture is added a solution of about 5 g. of the 20-dioxolane of 2-hydroxymethylene-6α-methyl - 11β - hydroxy-4-pregnene-3,20-dione in 50 ml. of warm ethanol, and the resulting mixture is heated under reflux for about 2 hours. To the reaction mixture, which contains the 20-dioxolane of 6α-methyl-11β-hydroxy - 20 - oxo-2′-p-fluorophenyl-4-pregneno-[3,2-c]pyrazole, is added 15 ml. of water and about 10 ml. of glacial acetic acid, and the resulting mixture is heated under reflux for a period of about 15 minutes, during which time the pyrazole product begins to precipitate. The resulting mixture is diluted with about 150 ml. of water, and the aqueous mixture is allowed to stand at a temperature of about 0–5° C. for a period of several hours. The insoluble material is recovered by filtration, washed thoroughly with water, and air dried to give about 5 g. of pyrazole product. This material is dissolved in 4 liters of hot ethanol, 1 g. of activated charcoal is added with stirring, the charcoal is removed by filtration, and the filtered solution is evaporated to a volume of about 250 ml. The concentrated solution is cooled to room temperature, and stirred at this temperature for several hours. The material which crystallizes is recovered by filtration, washed with ethanol, and air dried to give about 4 g. of substantially pure 6α-methyl-11β-hydroxy-20-oxo-2′-p-fluorophenyl-4-pregneno-[3,2-c]pyrazole; m.p. 300–303° C. dec.

Various changes and modifications may be made in carrying out the present invention without departing from the spirit and scope thereof. Insofar as these changes and modifications are within the purview of the annexed claims, they are to be considered as part of our invention.

What is claimed is:

1. The process which comprises reacting a compound selected from the group of compounds having the following structural formulas A and B, and the $\Delta^4$ and $\Delta^{4,6}$-analogues of said compounds:

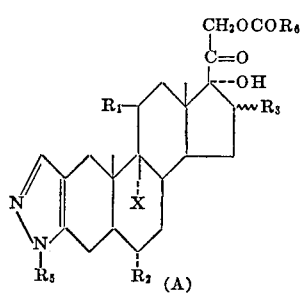

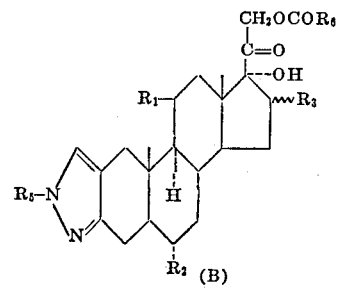

wherein:
$R_1$ is selected from the group consisting of hydrogen, β-hydroxy, and keto,
$R_2$ is selected from the group consisting of hydrogen, α-methyl and α-fluoro,
$R_3$ is selected from the group consisting of hydrogen, α-methyl, β-methyl and methylene,
$R_5$ is selected from the group consisting of hydrogen, lower alkyl, lower cycloalkyl, phenyl, halophenyl, and lower aralkyl,
$R_6$ is lower alkyl, and
X is selected from the group consisting of hydrogen and fluoro but X is fluoro only when $R_1$ is β-hydroxy and keto,
with a solution of a mineral acid in a lower alkanol to form a compound having the following structure, and the $\Delta^4$ and $\Delta^{4,6}$-analogues of said compounds:

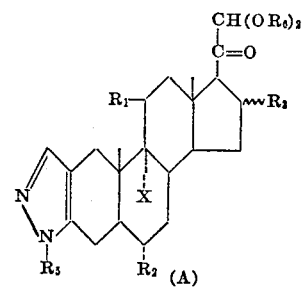

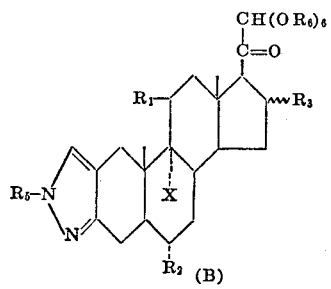

wherein $R_1$, $R_2$, $R_3$, $R_5$, $R_6$ and X have the meaning above defined.

2. The process which comprises treating a compound selected from the group of compounds having the following structure, and the $\Delta^4$ and $\Delta^{4,6}$-analogues of said compounds:

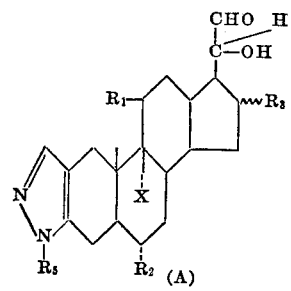

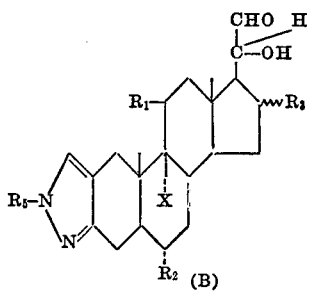

wherein:
$R_1$ is selected from the group consisting of hydrogen, β-hydroxy and keto,
$R_2$ is selected from the group consisting of hydrogen, α-methyl and α-fluoro,
$R_3$ is selected from the group consisting of hydrogen, α-methyl, β-methyl and methylene,
$R^5$ is selected from the group consisting of hydrogen, lower alkyl, lower cycloalkyl, phenyl, halophenyl, and lower aralkyl, and
X is selected from the group consisting of hydrogen, and fluoro, but X is fluoro only when $R_1$ is β-hydroxy and keto,
with an alkali metal bisulfite to form the corresponding bisulfite addition product, and then with an alkali metal alkoxide in a lower alkanol to give a compound having the following structural formulas:

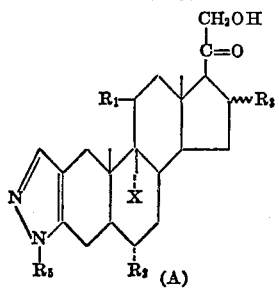

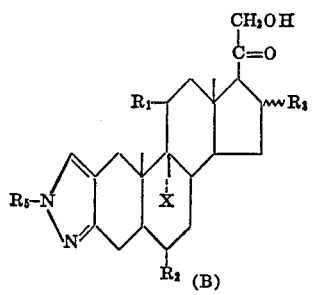

wherein $R_1$, $R_2$, $R_3$, $R_5$ and X have the meaning above defined.

References Cited
UNITED STATES PATENTS

| | | | |
|---|---|---|---|
| 3,158,601 | 11/1964 | Buchschacher et al. | 260—239.5 |
| 3,160,643 | 12/1964 | Burn et al. | 260—397.4 |

FOREIGN PATENTS

| | | | |
|---|---|---|---|
| 911,814 | 11/1962 | Great Britain | 260—239.5 |

OTHER REFERENCES

Applezweig—Steroid Drugs, pp. 3, 4, 653 and 663, McGraw-Hill Co., N.Y. (1962).

HENRY A. FRENCH, Primary Examiner

U.S. Cl. X.R.
260—239.55 C, 999

UNITED STATES PATENT OFFICE
CERTIFICATE OF CORRECTION

PATENT NO. : 3,832,345
DATED : August 27, 1974
INVENTOR(S) : Ralph F. Hirschmann & John Fried It is certified that error appears in the above-identified patent and that said Letters Patent are hereby corrected as shown below:

In Column 40, Claim 1, line 45,   "$CH(OR_6)_6$"
should read $$--CH(OR_6)_2--$$

Signed and Sealed this ninth Day of September 1975

[SEAL]

Attest:

RUTH C. MASON
Attesting Officer

C. MARSHALL DANN
Commissioner of Patents and Trademarks